United States Patent
Dannheim et al.

(10) Patent No.: US 6,444,794 B1
(45) Date of Patent: Sep. 3, 2002

(54) WATER-SOLUBLE FIBER-REACTIVE DYES PREPARATION THEREOF AND USE THEREOF

(75) Inventors: Jörg Dannheim; Stefan Ehrenberg, both of Frankfurt am Main (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/576,701

(22) Filed: May 22, 2000

(30) Foreign Application Priority Data

May 26, 1999 (DE) .......................... 199 23 989

(51) Int. Cl.[7] .................. C09B 62/04; C09B 62/503; D06P 1/382; D06P 1/384
(52) U.S. Cl. ................. 534/618; 534/617; 534/641; 534/642; 540/126; 544/76; 544/189; 544/197; 544/198; 8/549
(58) Field of Search ................. 534/618, 641, 534/642; 540/126; 544/76, 189, 197, 198; 8/549

(56) References Cited

U.S. PATENT DOCUMENTS

| | | | |
|---|---|---|---|
| 5,015,731 A | 5/1991 | Schwaiger et al. | 534/618 |
| 5,200,512 A * | 4/1993 | Reiher | 534/635 |
| 5,227,475 A * | 7/1993 | Buch et al. | 534/629 |
| 5,321,134 A | 6/1994 | Beck et al. | 540/126 |
| 5,484,458 A | 1/1996 | Russ et al. | 8/549 |
| 5,496,381 A | 3/1996 | Russ et al. | 8/549 |
| 5,607,481 A | 3/1997 | Russ et al. | 8/463 |
| 5,696,258 A * | 12/1997 | Schumacher et al. | 544/76 |

FOREIGN PATENT DOCUMENTS

| | | |
|---|---|---|
| DE | 19504800 | 8/1996 |
| EP | 0382111 | 8/1990 |
| EP | 0541057 | 5/1993 |
| EP | 0629667 | 12/1994 |
| EP | 0644239 | 3/1995 |
| EP | 0697443 | 2/1996 |
| GB | 2 332 681 | 6/1999 |
| WO | WO94/21646 | 9/1994 |
| WO | WO94/29282 | 12/1994 |

OTHER PUBLICATIONS

Abstract/Zusammenfassung/Abrege XS 0011033910 MA.

* cited by examiner

Primary Examiner—Fiona T. Powers
(74) Attorney, Agent, or Firm—Connolly Bove Lodge & Hutz LLP

(57) ABSTRACT

Disclosed are water-soluble dyes, such as azo dyes, metal complex dyes, anthraquinone, phthalocyanine and formazan dyes which, optionally via a bridge member, possess a fiber-reactive group of the vinyl sulfone series and further contain a 4-cyanamido-1,3,5-triazin-6-ylamino radical which is 2-substituted by a group of the general formula (2)

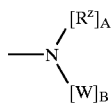

(2)

where $R^z$ is hydrogen, lower alkyl optionally substituted by alkyl, hydroxyl, cyano, lower alkoxy, carboxyl, sulfamoyl, sulfo or sulfato or an optionally substituted phenyl radical, or is a cyclohexyl radical or an optionally substituted phenyl radical, W is an alkyl radical which is substituted by a reactive group and may be interrupted by a hetero atom, A is zero or 1 and B is 1 or 2, subject to the proviso that the sum of (A+B) is 2. The dyes are fiber-reactive and useful for application by the known techniques for fiber-reactive dyes for dyeing hydroxyl- and/or carboxamido-containing material, especially fiber material, such as cotton, wool, silk and synthetic polyamide.

20 Claims, No Drawings

WATER-SOLUBLE FIBER-REACTIVE DYES PREPARATION THEREOF AND USE THEREOF

This invention relates to the technical field of fiber-reactive dyes.

The PCT Patent Application Publications Nos. WO 90/13603 and WO 90113604 disclose fiber-reactive dyes which have a fiber-reactive group of the vinyl sulfone series and also an s-triazinylamino radical substituted by a cyanamide group.

The commercial practice of dyeing with reactive dyes has recently led to heightened expectations with regard to the quality of the dyeings and the economics of the dyeing process. There consequently continues to be a demand for novel fiber-reactive dyes with improved properties, especially application properties. More particularly, even very short liquor ratios shall provide dyeings having very high color strength, good wash-off properties and high levelness.

The present invention, then, provides novel and useful fiber-reactive dyes of the hereinbelow indicated and defined general formula (1) which have the required application properties. The novel, inventive dyes have the general formula (1)

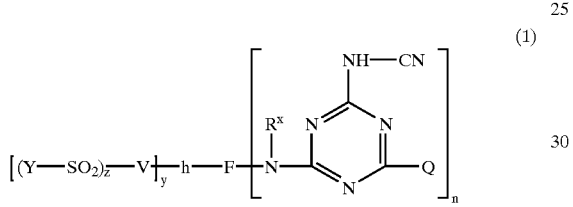

(1)

where
F is the residue of a monoazo, disazo or polyazo dye or of a derived heavy metal complex azo dye or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;

$R^x$ is a hydrogen atom or an alkyl group of 1 to 4 carbon atoms, such as methyl or ethyl, which may be substituted by halogen, such as chlorine and bromine, hydroxyl, cyano, alkoxy of 1 to 4 carbon atoms, such as methoxy and ethoxy, alkoxycarbonyl of 2 to 5 carbon atoms, carboxyl, sulfamoyl, sulfo or sulfato, preferably methyl or ethyl and especially a hydrogen atom;

n is 1 or 2, preferably 1;

Q is a group of the general formula (2)

(2)

where
$R^z$ is a hydrogen atom or an alkyl group of 1 to 4 carbon atoms, such as especially methyl or ethyl, which may be substituted by halogen, such as chlorine and bromine, hydroxyl, cyano, alkoxy of 1 to 4 carbon atoms, such as methoxy and ethoxy, carboxyl, sulfamoyl, sulfo, sulfato, phenyl or phenyl substituted by substituents selected from the group consisting of halogen, such as chlorine and bromine, alkoxy of 1 to 4 carbon atoms, such as methoxy and ethoxy, alkyl of 1 to 4 carbon atoms, such as methyl, sulfo and carboxyl, or is a cyclohexyl radical, a phenyl radical or a phenyl radical substituted by substituents selected from the group consisting of halogen, such as chlorine and bromine, alkoxy of 1 to 4 carbon atoms, such as methoxy and ethoxy, alkyl of 1 to 4 carbon atoms, such as methyl, sulfo and carboxyl, is alkyl-$SO_2$—Y, alkyl-Het-alkyl-$SO_2$—Y, where alkyl represents an alkyl group of 1 to 4 carbon atoms, Het is —O—, —NH—, —N(alkyl)— where alkyl is as defined above, —S— or $SO_2$ and Y is as defined below;

A is zero or 1, and

B is 1 or 2, the sum of (A+B) is 2 and in the event of B being 2 the groups of the formula —W— being identical to or different from each other;

V is a direct bond or an alkylene group or is a substituted or unsubstituted arylene radical or an alkylene-arylene or arylene-alkylene or alkylene-arylene-alkylene or arylene-alkylene-arylene radical or an arylene-arylene radical interrupted by one of the hetero groups indicated hereinafter, where the alkylene radicals are alkylene radicals of 1 to 8, preferably 2 to 6, especially 2 to 4, carbon atoms and may be substituted, for example by sulfo, carboxyl, sulfato and/or phosphato, and the arylene radicals are substituted or unsubstituted phenylene or naphthylene radicals, and where the alkylene radicals may be interrupted by 1 or more, such as 2 or 3, hetero groups, such as —NH—, —N(R)— where R is alkyl of 1 to 4 carbon atoms which may be sulfo-, carboxyl-, sulfato-, phenyl- or sulfophenyl-substituted, —O—, —S—, $-SO_2-$, —CO—, $-SO_2-NH-$, $-NH-SO_2-$, —NH—CO— and —CO—NH—, and the alkylene and arylene moieties in the combined alkylene/arylene radicals may in each case be separated from each other by such a hetero group;

y is 0, 1 or 2, preferably 1;

z is 1 or 2, preferably 1;

h is for y=2 a nitrogen atom or for y=1 a group of the formula —NH—, —N(R)— where R is as defined above, —NH—CO—NH—, —NH—CO— or —CO—NH— or preferably a direct bond;

Y is vinyl or is an ethyl group β-substituted by an alkali-eliminable substituent, such as β-sulfatoethyl, β-thiosulfatoethyl or β-phosphatoethyl or a β-alkanoyloxyethyl group having 2 top carbon atoms in the alkanol radical, such as β-acetyloxyethyl, or β-benzoyloxyethyl, β-(sulfobenzoyloxy)ethyl or β-(p-toluenesulfonyloxy)ethyl or β-haloethyl, such as β-bromoethyl or β-chloroethyl, and is preferably vinyl and especially β-sulfatoethyl, Y may also be hydroxyl if the hydroxyl group is subsequently converted with sulfuric acid or chlorosulfonic acid into a sulfato group, in which case the —$SO_2$—Y group or groups may be attached to an aromatic carbon atom of F or V via an alkylene radical of 1 to 4 carbon atoms, such as methyl, or via an alkylamino group of 1 to 4 carbon atoms, such as methylamino or ethylamino.

F is preferably the residue of a mono- or disazo dye or the residue of a metal complex azo dye, as of an o,o' 1:1 copper complex monoazo or disazo dye or of a triphendioxazine, of an anthraquinone or of a phthalocyanine dye, as of a copper phthalocyanine dye.

The basic structure of F may contain customary organic dye substituents. Examples of such substituents are alkyl groups of 1 to 4 carbon atoms, such as methyl, ethyl, propyl, isopropyl or butyl, preferably ethyl and especially methyl; alkoxy groups of 1 to 4 carbon atoms, such as methoxy, ethoxy, propoxy, isopropoxy and butoxy, preferably ethoxy and especially methoxy; acylamino groups of 2 to 8 carbon atoms, such as acetylamino, propionylamino or benzoylamino; primary and mono- or disubstituted amino groups, substituents being for example alkyl groups of 1 to 4 carbon atoms and/or phenyl groups, such as monoalkylamino and dialkylamino groups having 1 to 4 carbon atoms in the alkyl radical, phenylamino or N—($C_1$–$C_4$-alkyl)-N-phenylamino groups, which alkyl radicals may be further substituted, for example by phenyl, sulfophenyl, hydroxyl, sulfato, sulfo and carboxyl, and which phenyl groups may be further substituted, as by chlorine, sulfo, carboxyl, methyl and/or methoxy, for example methylamino, ethylamino, propylamino, isopropylamino, butylamino, N,N-di(β-hydroxyethyl)amino-, N,N-di(β-sulfatoethyl)-amino, sulfobenzylamino, N,N-di(sulfobenzyl)amino and diethylamino groups and also phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups which may be mono- and disubstituted by alkyl of 1 to 4 carbon atoms, in which case the alkyl radicals may in turn be substituted, for example by hydroxyl, sulfato, sulfo, carboxyl, phenyl and sulfophenyl, for example N-methylcarbamoyl and N-ethylcarbamoyl; sulfamoyl groups which may be mono- or disubstituted by alkyl groups of 1 to 4 carbon atoms, and N-phenyl-N-alkylsulfamoyl groups having an alkyl group of 1 to 4 carbon atoms, in which case these alkyl groups may in turn be substituted by hydroxyl, sulfato, sulfo, carboxyl, phenyl and sulfophenyl, for example N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl) sulfamoyl; N-phenylsulfamoyl, ureido, hydroxyl, carboxyl, sulfomethyl and sulfo groups.

The dye residue F is preferably substituted by one or more, as by 2 to 4, sulfo groups and may further preferably contain substituents selected from the group consisting of sulfo, methyl, ethyl, methoxy, ethoxy, alkanoylamino of 2 to 5 carbon atoms, such as acetylamino, benzoylamino, amino, chlorine, bromine, ureido, hydroxyl, carboxyl and sulfomethyl.

Water-solubilizing groups in W are for example carboxyl, sulfo, sulfato and phosphato.

In all the above formulae, the individual symbols, whether of different or identical designation within a general formula, may have identical or different meanings under their definition.

The groups "sulfo", "carboxyl", "phosphato", "thiosulfato" and "sulfato" include not only their acid form but also their salt form. Accordingly, sulfo groups are groups conforming to the general formula —$SO_3M$, carboxyl group are groups conforming to the general formula —COOM, phosphato groups are groups conforming to the general formula —$OPO_3M_2$, thiosulfato groups are groups conforming to the general formula —S—$SO_3M$ and sulfato groups are groups conforming to the general formula —$OSO_3M$, in each of which M is a hydrogen atom or a salt-forming metal atom, such as an alkali metal, such as sodium, potassium or lithium.

$R^x$ is for example hydrogen, methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, β-bromopropyl, β-hydroxyethyl, β-hydroxybutyl, β-cyanoethyl, sulfomethyl, β-sulfoethyl, amidosulfonylmethyl and β-sulfatoethyl.

$R^z$ is for example hydrogen, methyl, ethyl, carboxymethyl, carbomethoxymethyl, carbethoxymethyl, sulfomethyl, sulfamidomethyl, β-carboxyethyl, β-sulfatoethyl, n-propyl, β-carboxypropyl, β-sulfatoethyl, β-ethoxyethyl, β-methoxypropyl, β-chloropropyl, β-bromopropyl, n-butyl, isobutyl, cyclohexyl, phenyl, 2-chlorophenyl, 3-chlorophenyl, 4-chlorophenyl, 2- or 3- or 4-sulfophenyl, 2-methylphenyl, 4-methoxyphenyl, 3-methylphenyl and 4-ethylphenyl. Of these, preference is given to the optionally substituted alkyl groups and particularly preferably to methyl, ethyl and hydrogen.

In V, any arylene and aryl is preferably respectively phenylene/naphthylene and phenyl/naphthyl, which may each contain one or more, such as 2 or 3, preferably 1 or 2, substituents, for example selected from the group consisting of alkyl of 1 to 4 carbon atoms, such as methyl and ethyl, halogen, such as fluorine, chlorine and bromine, hydroxyl, cyano, alkoxy of 1 to 4 carbon atoms, such as methoxy and ethoxy, sulfamoyl, trifluoromethyl and alkoxycarbonyl of 2 to 5 carbon atoms, such as methoxycarbonyl and ethoxycarbonyl, and if necessary belonging to the group of the water-solubilizing substituents.

Alkyl in W is preferably straight-chain or branched alkyl of 2 to 6 carbon atoms which may be interrupted by the indicated hetero groups, such as 1 or 2 of these hetero groups, and if necessary substituted by one or more water-solubilizing groups. Preference here is given to straight-chain alkyl of 2 to 4 carbon atoms or alkyl of 4 carbon atoms which is interrupted by an oxygen atom or an amino or methylamino group. Particularly preferred alkyl is sulfo-, carboxyl-, sulfato- or phosphato-substituted ethyl or n-propyl.

Radicals of the general formula (2) are for example:
$(CH_2)_2SO_2CH_2CH_2OSO_3M$, —$(CH_2)_3SO_2CH_2CH_2OSO_3M$, —$(CH_2)_2SO_2CH_2CH_2Cl$ —$(CH_2)_2O(CH_2)_2SO_2CH=CH_2$, —$(CH_2)_2O(CH_2)_2SO_2CH_2CH_2Cl$, —$(CH_2)_2SO_2CH=CH_2$, where M is as defined above.

V is preferably a direct bond. Arylene V is preferably an unsubstituted or sulfo-substituted naphthylene radical or a phenylene radical which may be substituted by 1 or 2 substituents selected from the group consisting of alkyl of 1 to 4 carbon atoms, alkoxy of 1 to 4 carbon atoms, halogen, such as chlorine and bromine, alkylsulfonyl of 1 to 4 carbon atoms, sulfo, carboxyl and trifluoromethyl.

Alkylene V is preferably alkylene of 2 to 6 carbon atoms, which may optionally be interrupted by one or more of the abovementioned hetero groups and substituted by one or more of the substituents mentioned.

Preferred —V-h-radicals are: 1,4-phenylene, 1,3-phenylene, 1,4-phenyleneamino, 1,3-phenyleneamino, 2-methyl-5-methoxy-1,4-phenylene-4-amino, 4-chloro-1,3-phenylene-3-amino, 4-hydroxy-1,3-phenylene-3-amino, 4-methoxy-1,3-phenylene-3-amino, 2,5-dimethoxy-1,4-phenylene-4-amino, 4-carboxy-1,3-phenylene-3-amino and radicals of the formulae

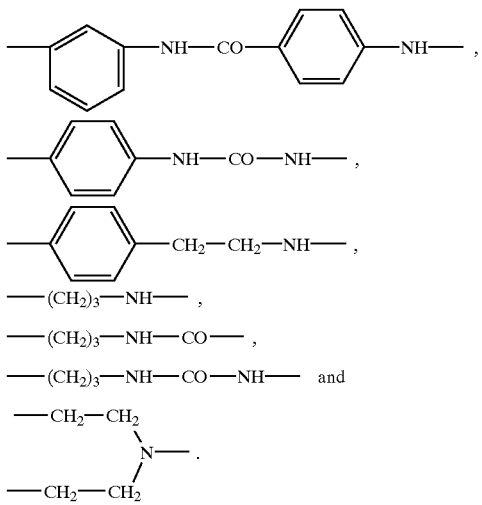

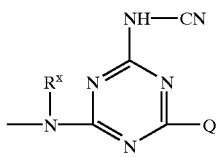

The grouping of the formula (3)

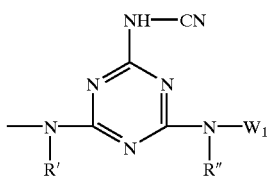

attached to the dye residue F is preferably a radical of the general formula (3a)

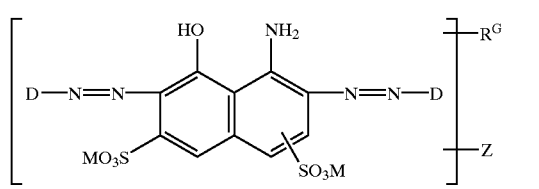

where

R' is methyl or ethyl or especially hydrogen,

R" is a hydrogen atom or a methyl or ethyl group or 2-sulfophenyl, 3-sulfophenyl, 4-sulfophenyl, 2,4-disulfophenyl, 2,5-disulfophenyl, 2-carboxyphenyl, 4-carboxyphenyl, phenyl, 4-methyl-2-sulfophenyl, 4-methoxy-2-sulfophenyl, 2-methyl-1-sulfophenyl, 2-naphthyl-1,5-disulfonyl, 2-naphthyl-4,8-disulfonyl, 2-naphthyl-3,6,8-trisulfonyl, and $W_1$ is alkyl-$SO_2$—Y or alkyl-Het-alkyl-$SO_2$—Y.

Important azo dyes conforming to the general formula (1) are those in which F is a residue of a dye of the benzene-azo-naphthol, of the benzene-azo-1-phenyl-5-pyrazolone, of the benzene-azo-benzene, of the naphthalene-azo-benzene, of the benzene-azo-aminonaphthalene, of the naphthalene-azo-naphthalene, of the naphthalene-azo-1-phenyl-5-pyrazolone, of the benzene-azo-pyridone and of the naphthalene-azo-pyridone series, and here too sulfo-containing dyes are preferred.

Of the 1:1 copper complex azo dyes according to the invention, those of the benzene and naphthalene series are preferred.

Preferred azo dyes of the general formula (1) are for example those of the general formulae (4a) and (4b)

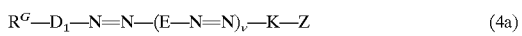

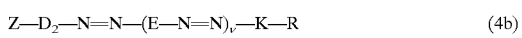

and the derived heavy metal complex compounds, such as 1:1 copper complex compounds, where $D_1$ is the radical of a diazo component of the benzene or naphthalene series, $D_2$ is the radical of a diazo component of the diaminobenzene or diaminonaphthalene series, E is the radical of a middle component of the benzene or naphthalene series, K is the radical of a coupling component of the benzene, naphthalene, pyrazolone, 6-hydroxy-2-pyridone or acetoacetarylamide series, where $D_1$, E and K may contain customary azo dye substituents, for example hydroxyl, amino, methyl, methoxy, ethoxy,, sulfo, carboxyl, substituted or unsubstituted alkanoylamino groups of 2 to 4 carbon atoms in the alkanoyl radical, substituted or unsubstituted benzoylamino groups and halogen atoms, such as bromine and chlorine atoms, and $D_1$, E and K together possess at least two sulfo groups, preferably three or four sulfo groups, v is zero or 1, Z is a group of the formula (3) or preferably of the formula (3a), and $R^G$ is a group of the general formula (5)

where Y, V, h, z and g are each as defined above.

Preference is further given to azo dyes of the general formula (4c) or (4d)

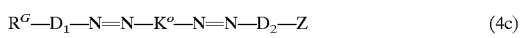

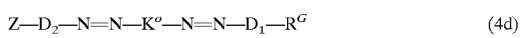

where $R^G$ is as defined above, $D_1$ and $D_2$ are independently the radical of a diazo component of the benzene or naphthalene series and $K^o$ is the radical of a bivalent coupling component of the naphthalene series, where $D_1$, $D_2$ and $K^o$ may bear customary azo dye substituents, such as those already mentioned, subject to the proviso that $D_1$, $D_2$ and $K^o$ together contain at least two sulfo groups, preferably three or four sulfo groups.

Such azo dyes of the general formula (1) are in particular dyes of the general formulae (4e), (4f and (4g)

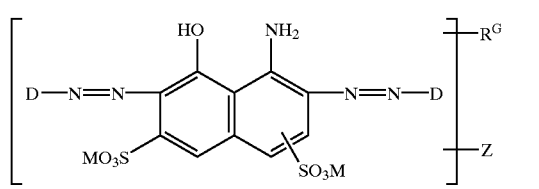

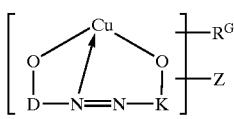

(4g)

where

R$^G$ has one of the above meanings and is attached to D or K,

Z is a radical of the general formula (3) or (3a) or (3b), n is 1 or 2, preferably 1, Z is attached to D or to K or when n=2 respectively to D and K or to both, subject to the proviso that R$^G$ and Z are preferably not both attached to D or K, D is the radical of a diazo component, to which a further azo radical may be attached, the two Ds in the formula (4f) being identical to or different from each other, and is for example a D$_1$ radical as defined above or below, E is the bivalent radical of a coupleable and diazotizable compound, for example as defined above or below, K is the radical of a coupling component, to which a further azo radical may be attached, for example as defined above or below, v is zero or 1, and M is a hydrogen atom or an alkali metal, such as sodium, potassium or lithium.

Preferred metal complex azo dyes according to the invention are for example copper complex azo dyes of the general formula (4h)

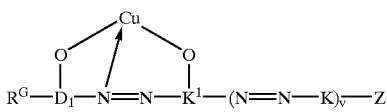

(4h)

where D$_1$, R$^G$, K, v and Z are each as defined above and D$_1$ is preferably a radical apparent hereinbelow from the formula (5c) or (5d), and K$^1$ is the radical of an amino- and hydroxyl-containing coupling component, such as preferably the radical of an unsubstituted or sulfo-monosubstituted or -disubstituted aminonaphthol, and where the two copper-complexing oxy groups are attached to D$_1$ and K$^1$ respectively in the ortho position and the vicinal position relative to the azo group.

Aromatic radicals of diazo components which bear a fiber-reactive group of the formula Y—SO$_2$—, such as those of the formulae R$^G$—D$_1$—NH$_2$ and R$^G$—D$_1$—NH$_2$, are for example those of the general formula (5a), (5b), (5c) and (5d)

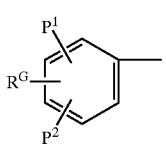

(5a)

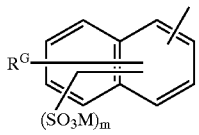

(5b)

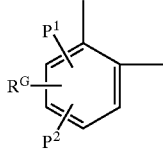

(5c)

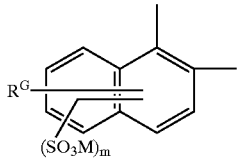

(5d)

where

R$^G$ is a radical of the formula (5),

P$^1$ is hydrogen, methyl, ethyl, methoxy, ethoxy, alkanoyl of 2 to 5 carbon atoms, such as acetyl and propionyl, cyano, carboxyl, sulfo, alkoxycarbonyl of 2 to 5 carbon atoms, such as methoxycarbonyl and ethoxycarbonyl, carbamoyl, N—(C$_1$–C$_4$-alkyl)carbamoyl, fluorine, chlorine, bromine or trifluoromethyl, P$^2$ is hydrogen, methyl, ethyl, methoxy, ethoxy, cyano, carboxyl, sulfo, alkanoylamino of 2 to 5 carbon atoms, such as acetylamino, alkoxycarbonyl of 2 to5 carbon atoms, such as methoxycarbonyl and ethoxycarbonyl, carbamoyl, N—(C$_1$–C$_4$-alkyl)sulfamoyl, alkylsulfonyl of 1 to 4 carbon atoms, phenylsulfonyl or phenoxy, where the benzene nucleus in the formulae (5a) and (5b) may additionally contain a hydroxyl group in the ortho position relative to the free bond which leads to the azo group, m is zero, 1 or 2 (this group being a hydrogen atom when p is zero), and M is as defined above.

Preferably, of these radicals, P$^1$ is hydrogen, methyl, methoxy, bromine, chlorine, carboxyl or sulfo and P$^2$ is hydrogen, methyl, methoxy, chlorine, carboxyl, sulfo or acetylamino.

Aromatic radicals of diaminobenzene and diaminonaphthalene diazo components conforming to the general formulae H$_2$N—D—NH$_2$ and H$_2$N—D$_2$—NH$_2$ which contain the fiber-reactive radical Z are preferably radicals of the general formulae (6a) and (6b)

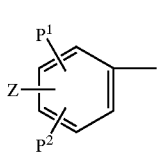

(6a)

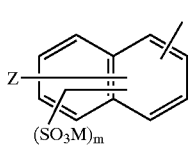

(6b)

where Z, M, m, $P^1$ and $P^2$ each have the above-indicated, especially the preferred meanings, and the benzene nucleus in the formulae (6a) and (6b) may additionally a contain a hydroxyl group in the ortho position relative to the free bond which leads to the azo group.

Aromatic radicals E of a coupleable and diazotizable compound of the general formula $H—E—NH_2$ are for example those of the general formulae (7a), (7b) and (7c)

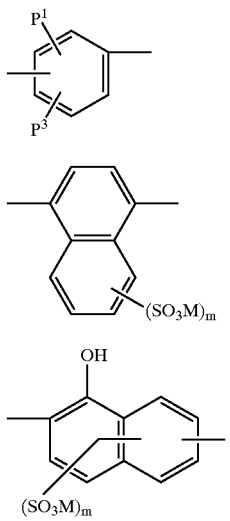

(7a)

(7b)

(7c)

where $P^1$, M and m are each as defined above, and $P^3$ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido having 1 to 4 carbon atoms in the alkyl moiety, phenylsulfonyl or alkylsulfonyl of 1 to 4 carbon atoms.

$—K—R^G$ radicals of coupling components of the general formulae $H—K—R^G$ which bear the fiber-reactive group of the formula $—SO_2—Y$ are for example those of the general formulae (8a) to (8h)

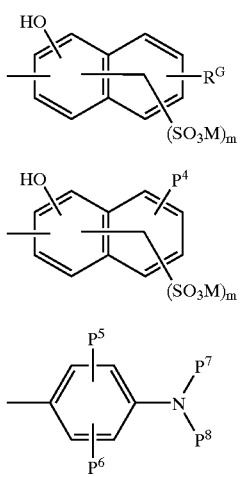

(8a)

(8b)

(8c)

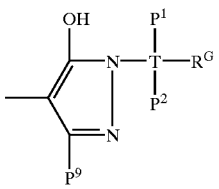

(8d)

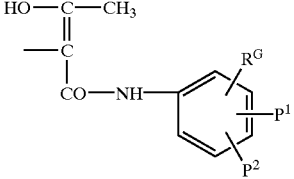

(8e)

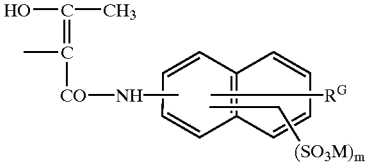

(8f)

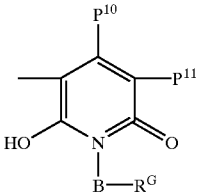

(8gh)

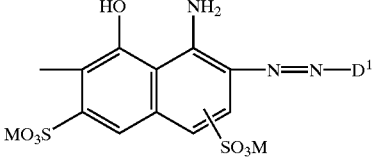

(8h)

where $R^G$, $P^1$, $P^2$, m and M are each as defined above, $P^4$ is phenylureido which is substituted in the phenyl radical by chlorine, methyl, methoxy, sulfo and/or carboxyl or by a group $—SO_2—Y$ where Y is as defined above, or is benzoylamino which is substituted in the benzene radical by chlorine, methyl, methoxy, nitro, sulfo and/or carboxyl and by a group $—SO_2—Y$ where Y is as defined above, $P^5$ is hydrogen, alkyl of 1 to 4 carbon atoms, such as methyl and ethyl, alkoxy of 1 to 4 carbon atoms, such as methoxy and ethoxy, bromine, chlorine or alkanoylamino of 2 to 7 carbon atoms, such as acetylamino and propionylamino, $P^6$ is hydrogen, alkyl of 1 to 4 carbon atoms, such as methyl and ethyl, alkoxy of 1 to 4 carbon atoms, such as methoxy and ethoxy, chlorine or alkanoylamino of 2 to 7 carbon atoms, such as acetylamino and propionylamino, ureido or phenylureido, $P^7$ is hydrogen or alkyl of 1 to 4 carbon atoms, which may be substituted by hydroxyl, cyano, carboxyl, sulfo, sulfato, methoxycarbonyl, ethoxycarbonyl or acetoxy or a group $—SO_2—Y$ of the above definition, $P^8$ is alkyl of 1 to 4 carbon atoms which is substituted by an $—SO_2—Y$ group of the above definition and may be substituted by hydroxyl, cyano, carboxyl, sulfo, sulfato, methoxycarbonyl, ethoxycarbonyl or acetoxy, or is benzyl or phenyl or phenyl substituted by alkyl of 1 to 4 carbon atoms, alkoxy of 1 to 4 carbon atoms, chlorine and/or sulfo, in which case the phenyl radical is in each case substituted by an —SO$_2$—Y group of the above definition, P$^9$ is hydrogen, alkyl of 1 to 4 carbon atoms, such as methyl, cyano, carboxyl, carbalkoxy of 2 to 5 carbon atoms, such as carbomethoxy and carbethoxy, carbamoyl or phenyl, preferably methyl, carboxyl, methoxycarbonyl, ethoxycarbonyl or phenyl, especially methyl or carboxyl, T is a benzene or naphthalene ring, preferably a benzene ring, P$^{10}$ is hydrogen or alkyl of 1 to 4 carbon atoms, such as methyl, or alkyl of 1 to 4 carbon atoms substituted by alkoxy of 1 to 4 carbon atoms, such as methoxy, or cyano, and preferably is alkyl of 1 to 4 carbon atoms or phenyl, P$^{11}$ is hydrogen, chlorine, bromine, sulfo, carbamoyl, methylsulfonyl, phenylsulfonyl, cyano or sulfoalkyl of 1 to 4 carbon atoms, preferably hydrogen, sulfo, sulfoalkyl having an alkyl moiety of 1 to 4 carbon atoms, such as sulfomethyl, cyano or carbamoyl, B is alkylene of 1 to 4 carbon atoms, methylenephenylene, ethylenephenylene, phenylenemethylene, phenyleneethylene or phenylene or methylenephenylene, ethylenephenylene or phenylene which are each substituted by fluorine, chlorine, bromine, methyl, methoxy., cyano, sulfo, carboxyl, acetyl, nitro, carbamoyl and/or sulfamoyl in the benzene moiety, and D$^1$ is a radical of the general formula (5a) or (5b).

—K—Z radicals of coupling components of the general formula H—K—Z and H—K—N(R$^x$)H are for example radicals of the general formulae (9a) to (9h)

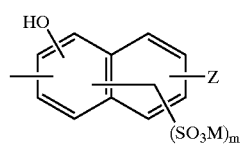
(9a)

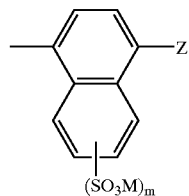
(9b)

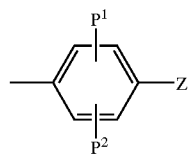
(9c)

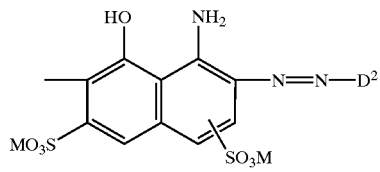
(9d)

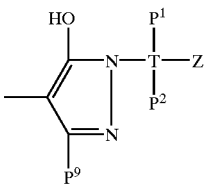
(9e)

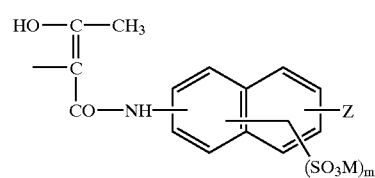
(9f)

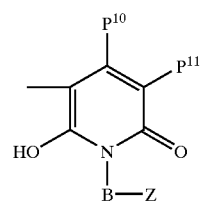
(9g)

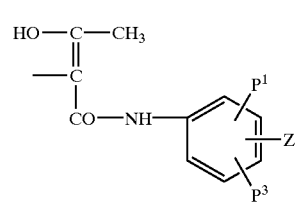
(9h)

where

R, P$^1$, P$^2$, P$^9$, P$^{10}$, P$^{11}$, B, T, M, m and Z each have the above-indicated, especially the preferred, meanings and D$^2$, as the radical of a diazo component, is a radical of the hereinabovementioned and defined general formula (6a) or (6b).

In the above formulae (8a), (8b) and (9a), the free bond, which leads to the azo group, and the hydroxyl group are disposed ortho to each other on the aromatic nucleus.

K and K$^1$ in the formulae (4g) and (4h) with a metal-complexing oxygen atom which contain the group Z are in particular those of the formulae (10a) to (10e)

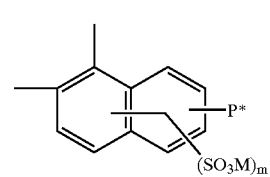
(10a)

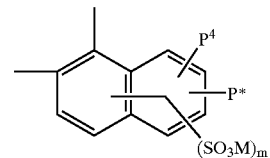
(10b)

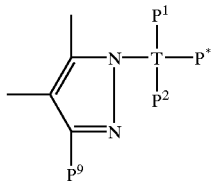
(10c)

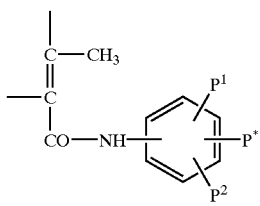
(10d)

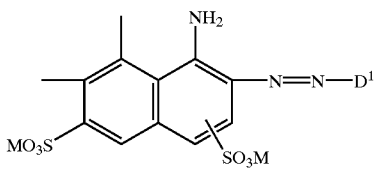
(10e)

where the individual symbols have one of the abovementioned meanings and P is either a Z radical or a grouping of the formula —N=N—K—Z.

Groups of the general formulae (5a) and (5b) are for example:

2-(β-sulfatoethylsulfonyl)phenyl, 3-(β-sulfatoethylsulfonyl) phenyl, 4-(β-sulfatoethyl-sulfonyl)phenyl, 2-carboxy-5-(β-sulfatoethylsulfonyl)phenyl, 2-chloro-3-(sulfatoethyl-sulfonyl)phenyl, 2-chloro4-(β-sulfatoethylsulfonyl) phenyl, 2-ethoxy-4- or -5-(β-sulfatoethylsulfonyl)phenyl, 2-ethyl-4-(β-sulfatoethylsulfonyl)phenyl, 2-methoxy-5- or -4-(β-sulfatoethylsulfonyl)phenyl, 2,4-diethoxy-5-(β-sulfato-ethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(p-sulfatoethylsulfonyl)phenyl, 2- or 3- or 4-(β-thiosulfatoethylsulfonyl)phenyl, 2-methoxy-5-(β-thiosulfatoethyl-sulfonyl)phenyl, 2-sulfo-4-(β-phosphatoethylsulfonyl)phenyl, 2-sulfo4-vinylsulfonyl-phenyl, 2-hydroxy-4- or -5-(β-sulfatoethylsulfonyl) phenyl, 2-chloro-4- or -5-(β-chloroethylsulfonyl)phenyl, 2-hydroxy-3-sulfo-5-(β-sulfatoethylsulfonyl)phenyl, 3- or 4-(β-acetoxyethylsulfonylphenyl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, 3- or 4-{β-[4-(β'-sulfatoethylsulfonyl)phenyl]ethylamino}phenyl, 3- or 4-{β-[2-sulfo-4-[β'-sulfatoethylsulfonyl)phenyl] ethylamino}phenyl, 3- or 4-[β-(β'-chloroethylsulfonyl)-ethylamino]phenyl, 3- or 4-[1-(β'-sulfatoethylsulfonyl) ethylamino]phenyl, 3- or 4-[β-(vinylsulfonyl)ethylamino] phenyl, 3- or 4-[β-(β'-chloroethylsulfonyl)propylamino]-phenyl, 3- or 4-[β-(β'-sulfatoethylsulfonyl)propylamino] phenyl, 3- or 4-[β-(vinylsulfonyl)-propylamino]-phenyl, 3,4-di-(β-sulfatoethylsulfonyl)phenyl, 2,5-di-(β-sulfatoethylsulfonyl)phenyl, 4-[β-(β'-sulfatoethylsulfonyl)propoxy]phenyl, 2, 5-bis-[(β-sulfatoethylsulfonyl)methyl]phenyl, 3- or 4-{N-[,-(β'-sulfatoethylsulfonyl)propylamidocarbonyl]}phenyl, 3,5-bis{N-[β-(β'-1 sulfatoethylsulfonyl) propylamidocarbonyl]phenyl, 3-sulfo-4-{[N-β-(β'-sulfatoethylsulfonyl)propylamidocarbonyl] methoxy}phenyl and 4-{[N-β-(β'-sulfatoethylsulfonyl) propylamidocarbonyl]methoxy}phenyl.

Of the phthalocyanine dyes according to the invention, preference is given to those which conform to the general formula (11)

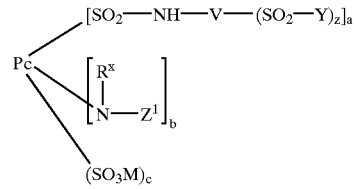
(11)

where

Pc is a copper or nickel phthalocyanine radical, $Z^1$ is a group of the general formula (3) or preferably (3a)

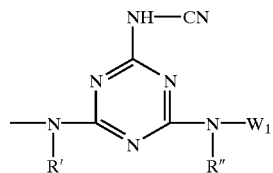

where R", R' and $W_1$ have the abovementioned, especially the preferred, meanings, a is from 1 to 3, b is from 1 to 2, and c is from 0 to 2, subject to the proviso that the sum of (a+b+c) is not more than 4 and the sum of (a+b) is from 2 to 4, and V,Y,$R^x$, M and z have one of the abovementioned, especially the preferred, meanings.

Of the azo dyes, preference is further given, to those which conform to the general formulae (12A) to (12V)

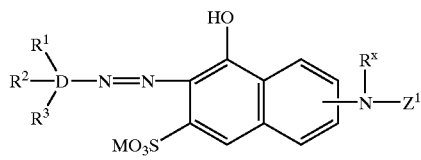
(12A)

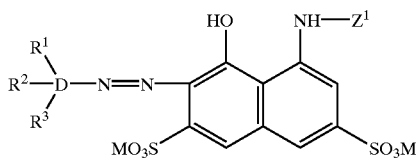
(12B)

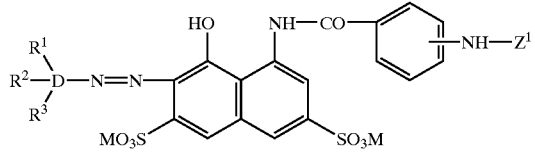 (12C)
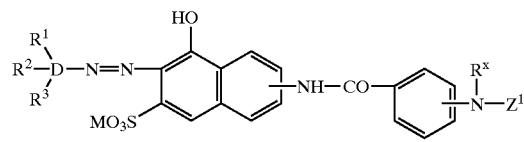 (12D)
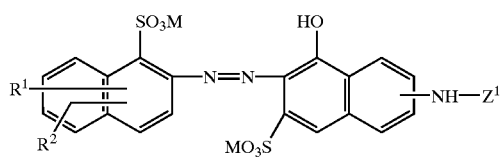 (12E)
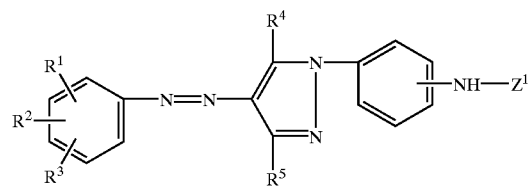 (12F)
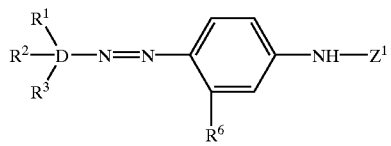 (12G)
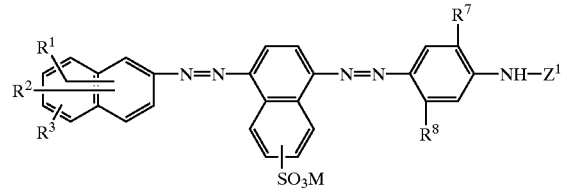 (12H)
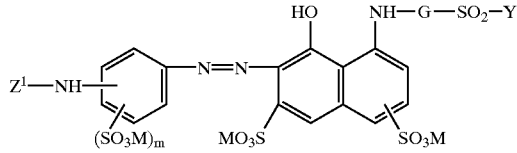 (12J)
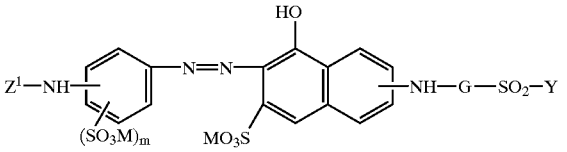 (12K)
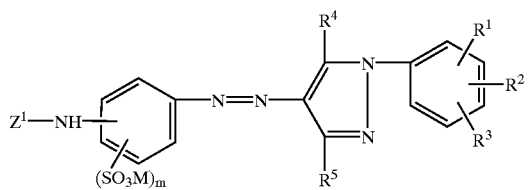 (12L)
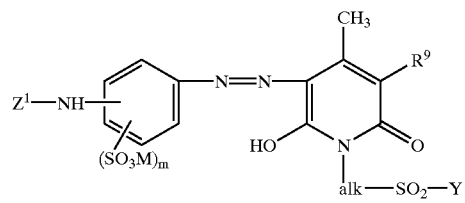 (12M)
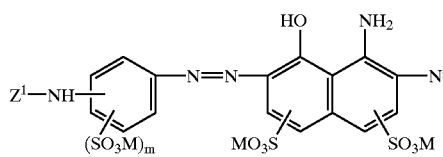 (12N)
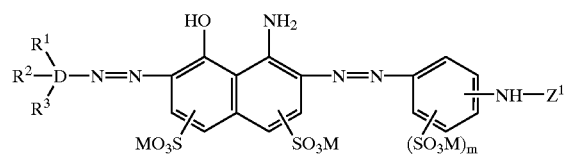 (12P)
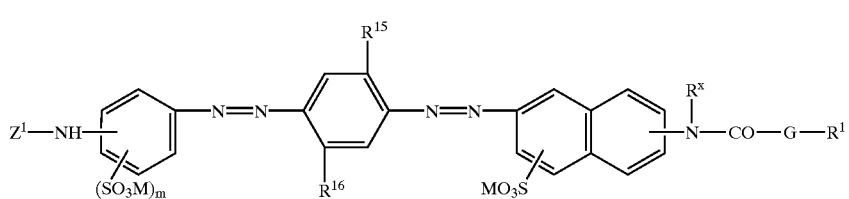 (12Q)

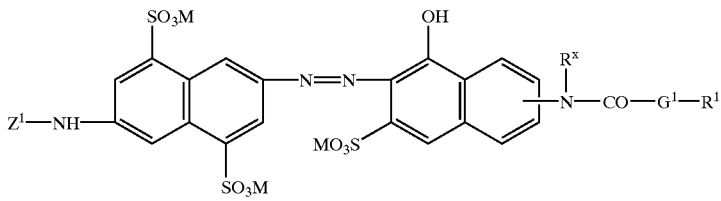
(12R)

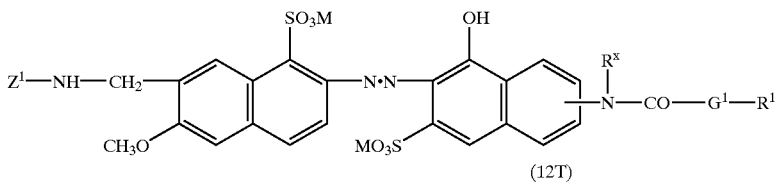
(12S)

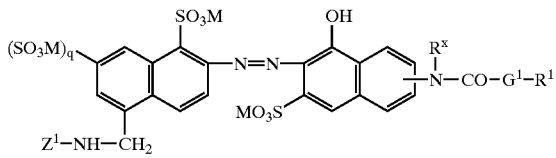
(12T)

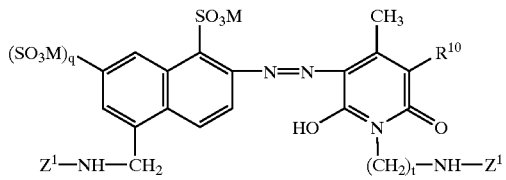
(12U)

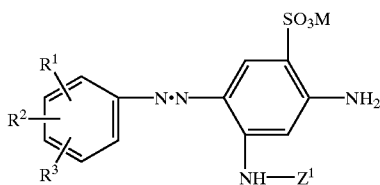
(12V)

where.

Z¹ is a radical of the formula (3) or preferably (3a)

M has one of the abovementioned meanings;

$R^x$ is hydrogen or alkyl of 1 to 4 carbon atoms, such as methyl or ethyl;

D is a benzene ring or is a naphthalene ring, the azo group preferably being attached in position 8 of a naphthalene ring and $R^2$ and $R^3$ on a naphthalene ring preferably being each independently hydrogen or sulfo;

$R^1$ is β-sulfatoethylsulfonyl, β-chloroethylsulfonyl or vinylsulfonyl;

$R^2$ is hydrogen, alkyl of 1 to 4 carbon atoms, such as ethyl and especially methyl, alkoxy of 1 to 4 carbon atoms, such as ethoxy and especially methoxy, halogen, such as chlorine and bromine, carboxyl, sulfo or a group of the formula —SO₂—Y where Y is as defined above, such as β-sulfatoethylsulfonyl, β-chloroethylsulfonyl or vinylsulfonyl, preferably hydrogen;

$R^3$ is hydrogen, alkyl of 1 to 4 carbon atoms, such as ethyl and especially methyl, alkoxy of 1 to 4 carbon atoms, such as ethoxy and especially methoxy, halogen, such as chlorine and bromine, carboxyl or sulfo, preferably hydrogen;

$R^4$ is hydroxyl or amino, preferably hydroxyl;

$R^5$ is methyl, carboxyl, carbomethoxy or carbethoxy, preferably methyl or carboxyl;

$R^6$ is acetylamino, ureido or methyl;

$R^7$ is hydrogen, alkyl of 1 to 4 carbon atoms, such as methyl and ethyl, alkoxy of 1 to 4 carbon atoms, such as methoxy and ethoxy, halogen, such as bromine and especially chlorine, preferably hydrogen, methyl, ethyl, methoxy, ethoxy or chlorine;

$R^8$ is hydrogen or alkyl of 1 to 4 carbon atoms, such as methyl and ethyl, alkanoylamino of 2 to 5 carbon atoms, such as acetylamino and propionylamino, or ureido, preferably hydrogen, methyl, ethyl, methoxy, ethoxy, acetylamino or ureido;

$R^9$ is hydrogen, cyano, carbamoyl, sulfamoyl or sulfomethyl, preferably hydrogen or carbamoyl;

$R^{10}$ is cyano, carbamoyl or sulfomethyl;

alk is alkylene of 2 to 4 carbon atoms, preferably ethylene;

G is alkylene of 2 to 4 carbon atoms, preferably n-ethylene or especially n-propylene, or is carbonylphenylene;

$G^1$ is phenylene or is a radical of the formula —NH—(CH₂)₃—;

m is zero, 1 or 2 (this group being hydrogen when m is zero);

q is zero or 1 (this group being hydrogen when q is zero);

t is 2 or 3;

in the compounds of the formulae (12A), (12D), (12E), (12K) and (12Q) to (12T), the amino grouping containing the fiber-reactive radical is in positions 2 or 3, on the 8-naphthol radical.

Amines of the general formula H—Q are for example:

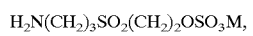

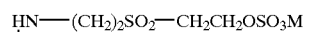

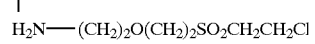

-continued

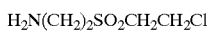

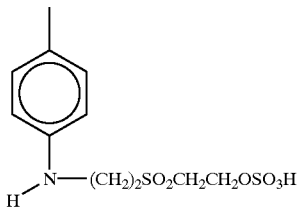

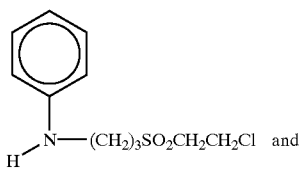

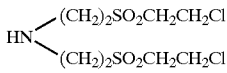

where M is as defined above.

The present invention further provides processes for preparing the dyes of the general formula (1) according to the invention. They can be prepared in a conventional manner similarly to known synthetic routes which are specific to the particular class of dye by reacting precursors which are typical of the particular dye and of which at least one contains a group of the general formula (3) and at least one a group of the general formula (5) with each other or by starting from an amino-containing starting compound of the general formula (55)

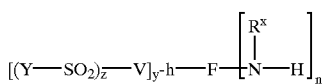

where F, $R^x$ and n are each as defined above, and reacting it with a trihalo-s-triazine of the general formula (56)

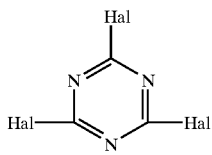

where Hal is a halogen atom, especially chlorine or fluorine, with cyanamide or an alkali metal salt thereof and with an amine of the general formula H—Q, where Q is as defined above, in stoichiometric amounts in any desired order and subsequently, if appropriate, effecting further, conventional, necessary conversion reactions.

More particularly, the dyes of the invention can be prepared according to the invention by reacting a compound conforming to the general formula (57)

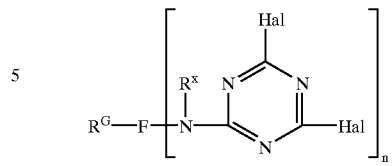

where $R^G$, F, $R^x$ and n are each as defined above and Hal is a halogen atom, especially chlorine or fluorine, with cyanamide or an alkali metal salt thereof and reacting the resulting compound of the general formula (58)

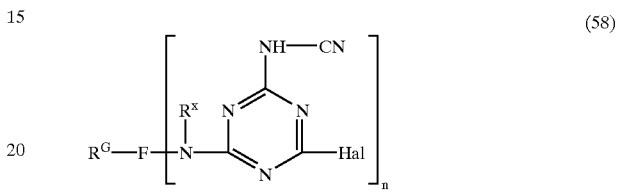

where $R^G$, F, $R^x$ and Hal are each as defined above, with an amine of the general formula H—Q, where Q is as defined above, or by reacting a compound of the general formula (59)

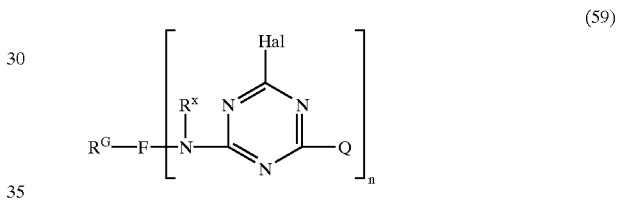

where $R^G$, F, $R^x$, Hal, Q and n are each as defined above, with cyanamide or an alkali metal salt thereof,
or by reacting a compound of the general formula (55) with a compound of the general formula (60)

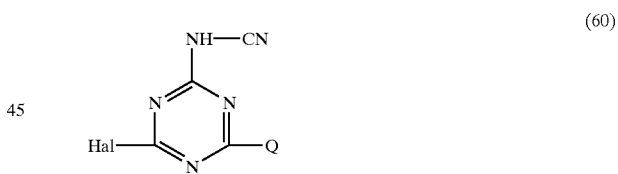

where Hal and Q are each as defined above.

The reactions of the starting compounds are carried out in suspension or solution in an aqueous or aqueous-organic medium. For reactions in an aqueous-organic medium, the organic medium is for example acetone, dimethylformamide or N-methylpyrrolidone. Advantageously, the hydrogen halide released in the course of the condensation is neutralized continuously by addition of aqueous alkali metal hydroxides, carbonates or bicarbonates.

The reaction of the starting compounds of the general formula (58) with the amine of the general formula H—Q takes place at a temperature between 30 and 100° C., preferably between 65 and 85° C., and at a pH between 3 and 11.5, preferably between 3.5 and 7, and the reaction of the compound of the formula (55) with the compound of the general formula (60) is preferably carried out at a temperature between 25 and 90° C., especially between 45 and 75° C., and at a pH between 3 and 11.5, especially between 3.5 and 6.5.

Compounds of the general formula (58), as well as by the reaction of a compound of the formula (57) with cyanamide, can also be prepared by, similarly to known procedures, reacting an appropriate 2,4-dihalo-6-cyanamido-s-triazine with a starting compound of the general formula (55) or, likewise similarly to known procedures, by reacting a dye intermediate which is customary for the type of dye but which contains a group of the general formula (61)

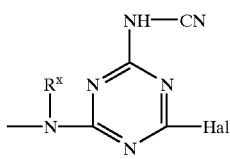

(61)

where $R^x$ and Hal are each as defined above, with a further intermediate containing a group of the formula (5).

A preferred process is the reaction of a halotriazine of the general formula (56), preferably trichlorotriazine, with cyanamide and subsequent condensation with an amine of the formula HQ to form a product of the general formula (60). The reaction with the HQ amine takes place at 0 to 60° C., preferably at 10 to 40° C., and at a pH between 4 and 9, preferably 5 and 8. The reaction with an amine of the general formula (55) then takes place at 20 to 90° C., preferably 30 to 70° C., and a pH of 2 to 6, preferably 3 to 6.

Alternatively, the amine of the general formula (55) may be replaced by a dye intermediate F' if the final dye is synthesized thereafter by coupling.

The amine of the formula H—Q is typically used in the reactions in the form of a salt, as of a sulfate or of an inner salt in the form of the hydrochloride.

Azo dyes are synthesized according to the invention from diazo and coupling components which contain the groups of the general formulae (3) and (5) by effecting the reactions in the conventional manner of diazotization and coupling reactions, the diazotization typically at a temperature between −5° C. and +15° C. and a pH below 2 by means of a strong acid and an alkali metal nitrite in a preferably aqueous medium and the coupling reaction typically at a pH between 1.5 and 4.5 in the case of an amino-containing coupling component and at a pH between 3 and 7.5 in the case of a hydroxyl-containing coupling component and at a temperature between 0 and 25° C., preferably likewise in an aqueous medium.

Heavy metal complex azo dyes, for example those conforming to the general formula (4h), are generally synthesized according to the invention from such heavy-metal-free azo compounds as contain a phenolic or naphtholic hydroxyl group in the coupling component ortho or vicinal relative to the azo group and whose diazo component radical contains a hydrogen atom or a hydroxyl group or a lower alkoxy group, such as methoxy, ortho to the azo group, and the heavy-metal-free starting azo compounds may also contain an acylamino radical, such as acetylamino. For example, the copper complex azo dyes of the formula (4h) may be synthesized from a starting compound conforming to the general formula (62)

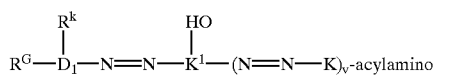

(62)

where $D_1$, K, $K^1$ and v are each as defined above and $R^k$ is a hydrogen atom or a hydroxyl or methoxy group attached to $D_1$ in a position ortho to the azo group, by reacting this acylamino-containing starting azo compound with a copper-donating agent, such as a copper salt, similarly to known and customary procedures. When $R^k$ is a hydrogen atom or a methoxy group, the compound (62) may be subjected to a conventional oxidative or dealkylating coppering reaction. The resulting copper complex azo compound, which contains an acylamino group, may then be reacted similarly to known procedures, after or with hydrolysis of the acylamino group to an amino group, with a cyanuric halide or a compound of the formula (60) to form the azo dye of the general formula (1) according to the invention.

Starting compounds containing a fiber-reactive grouping $R^G$ useful as diazo components are for example:
2-(β-sulfatoethylsulfonyl)aniline, 3-(β-sulfatoethylsulfonyl) aniline, 4-(β-sulfatoethylsulfonyl)aniline, 2-carboxy-5-(β-sulfatoethylsulfonyl)aniline, 2-chloro-3-(sulfatoethylsulfonyl)aniline, 2-chloro4-(β-sulfatoethylsulfonyl)aniline, 2-ethoxy-4- or -5-(β-sulfatoethylsulfonyl)aniline, 2-ethyl-4-(β-sulfatoethylsulfonyl)aniline, 2-methoxy-5- or -4-(O-sulfatoethylsulfonyl)aniline, 2,4-diethoxy-5-(β-sulfatoethylsulfonyl)aniline, 2,4-dimethoxy-5-(β-sulfatoethylsulfonyl)aniline, 2,5-dimethoxy-2(4-(β-sulfatoethylsulfonyl)aniline, 2-methoxy-5-methyl-4-(β-sulfatoethylsulfonyl)aniline, 2- or 3- or 4-(β-thiosulfatoethylsulfonyl)aniline, 2-methoxy-5-(β-thiosulfatoethylsulfonyl)aniline, 2-sulfo-4-(β-phosphatoethylsulfonyl)aniline, 2-sulfo-4-vinylsulfonylaniline, 2-hydroxy-4- or -5-(β-sulfatoethylsulfonyl)aniline, 2-chloro-4- or -5-)β-chloroethylsulfonyl)aniline, 2-hydroxy-3-sulfo-5-(β-sulfatoethylsulfonyl)aniline, 3- or 4-)β-acetoxyethylsulfonyl)aniline, 5-(β-sulfatoethylsulfonyl)-2-aminonaphthalene, 6- or 7- or 8-(β-sulfatoethylsulfonyl)-2-aminonaphthalene, 6-(β-sulfatoethylsulfonyl)-1-sulfo-2-aminonaphthalene, 5-(β-sulfatoethylsulfonyl)-1-sulfo-2-aminonaphthalene, 8-(β-sulfatoethylsulfonyl)-6-sulfo-2-aminonaphthalene, 3- or 4-{β-[4-)β-sulfatoethylsulfonyl)phen]ethylamino}aniline, 3- or 4-{β-[2-sulfo-4-)β-sulfatoethylsulfonyl)phen]ethylamino}aniline, 3- or 4-[β-(β'-chloroethylsulfonyl)ethylaminoaniline, 3- or 4-[β-(β'-sulfatoethylsulfonyl)ethylamino]aniline, 3- or 4-[β-(vinylsulfonyl)ethylamino]aniline, 3- or 4-[O-)β-chloroethylsulfonyl)propylamino]-aniline, 3- or 4-[β-)β'-sulfatoethylsulfonyl)propylamino]aniline, 3- or 4-[β-(vinylsulfonyl)propylaminolaniline, 3,4-di)β-sulfatoethylsulfonyl)aniline, 2,5-di(β-sulfatoethylsulfonyl)aniline, 4-[β-(β'-sulfatoethylsulfonyl)propoxy]aniline, 2,5-bis[(β-sulfatoethylsulfonyl)methyl]aniline, 3- or 4-{N-[β-(β'-sulfatoethylsulfonyl)propylamidocarbonyl]}aniline, 3,5-bis{N-[β-(β'-sulfatoethylsulfonyl)propylamidocarbonyl]}aniline, 3-sulfo-4-{]N-β-(β'-sulfatoethylsulfonyl)propylamidocarbonyl]methoxy}aniline and 4-{[N-β-(β'-sulfatoethylsulfonyl)propylamidocarbonyl]methoxy}aniline.

Starting compounds conforming to the general formula $H_2N$—D—$NH_2$ and $H_2N$—$D_1$—$NH_2$ are for example 1,4-phenylenediamine, 1,4-phenylenediamine-2-sulfonic acid, 1,4-phenylenediamine-2-carboxylic acid, 1,4-diaminonaphthalene-2-sulfonic acid, 2,6-diaminonaphthalene-8-sulfonic acid, 2,6-diaminonaphthalene-4,8-disulfonic acid, 1,3-phenylenediamine, 1,3-phenylenediamine-4-sulfonic acid, 1,3-phenylenediamine-4,6-disulfonic acid, 1,4- phenylenediamine-2,6-disulfonic acid, 1,4-phenylenediamine-2,5-disulfonic acid, 1,4-diaminonaphthalene-6-sulfonic acid, 4,4'-diaminobiphenyl-3-sulfonic acid and 4,4'-diaminostilbene-2,2'-disulfonic acid.

Starting compounds conforming to the general formula H—E—NH$_2$ useful for synthesizing disazo dyes according to the invention and serving as coupling components and, after the coupling, as diazo components are for example aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 2-sulfo-5-acetylaminoaniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino-2'-sulfophenyl)-3-methyl- or -3-carboxy-5-pyrazolone and N-(acetoacetyl)-3-sulfo-4-aminoanilide.

Starting compounds useful as coupling components conforming to the general formula H—K—R$^G$ for synthesizing azo dyes according to the invention are for example 1-[4'-(β-sulfatoethylsulfonyl)phenyl]-3-methyl-5-pyrazolone, 1-[4'-(vinylsulfonyl)phenyl]-3-methyl-5-pyrazolone, 1-[4'-(β-sulfatoethylsulfonyl)phenyl]-3-carboxy-5-pyrazolone, 1-[3'-[β-chloroethylsulfonyl)benzoylamino]-3,6-disulfo-8-naphthol, 1-[3'-(vinylsulfonyl)benzoylamino]-3,6-disulfo-8-naphthol, 1-[3'-(vinylsulfonyl)benzoylamino]4,6-disulfo-8-naphthol, 1-[3'-(β-sulfatoethylsulfonyl)benzoylamino]4,6-disulfo-8-naphthol, 2-[3'-(β-chloroethylsulfonyl)benzoylamino]-6-sulfo-8-naphthol, 2-[3'-(vinylsulfonyl)benzoylamino]-6-sulfo-8-naphthol, 3-[3'-(β-chloroethylsulfonyl)benzoylamino]-6-sulfo-8-naphthol, 3-[3'-(vinylsulfonyl)benzoylamino]-6-sulfo-8-naphthol, 6-sulfo-1-[3'-(β-chloroethylsulfonyl)benzoylamino] naphthol, 7-sulfo-[3'-(vinylsulfonyl)benzoylamino] naphthol, 2-[N-methyl—N-(β-sulfatoethylsulfonyl)amino]-6-sulfo-8-naphthol, 3-(N-methyl—N-(β-sulfatoethylsulfonyl)amino]-6-sulfo-8-naphthol, 2-[N-ethyl—N-(β-sulfatoethylsulfonyl)amino]-6-sulfo-8-naphthol, 1-[N'-(3'-β-chloroethylsulfonylphenyl)ureido]-3,6-disulfo-8-naphthol, 1-[N'-(3'-vinylsulfonylphenyl) ureido]-3,6-disulfo-8-naphthol, 1-[N'-(3'-vinylsulfonylpropyl)ureido]-3,6-disulfo-8-naphthol, 1-[N'-(3'-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-β-chloroethylsulfonylpropyl)ureido]-4,6-disulfo-8-naphthol, 2-[N'-(3'-β-sulfato ethylsulfonylphenyl)ureido]-6-sulfo-8-naphthol, 2-[N'-(3'-chloroethylsulfonylpropyl)-ureido]-6-sulfo-8-naphthol, 3-[N'-(3'-β-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3"-β-chloroethylsulfonyl)phenyl] ureidoaniline, 3-[N'-(3"-β-sulfatoethylsulfonyl)-phenyl] ureidoaniline and 6-sulfo-1-[N'-(3"-β-sulfatoethylsulfonyl) phenyl]ureido-8-naphthol.

Coupling components conforming to the general formula H—K—N(R$^x$)H useful for constructing azo dyes according to the invention in which the fiber-reactive radical Z is in the coupling component, in which case the fiber-reactive radical Z$^1$ or some other aforementioned halotriazine radical is or may be introduced subsequently into the amino group —N(R$^x$)H of the initially obtained amino-containing azo dye conforming to the general formula (55), are for example aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-(hydroxyacetylamino)aniline, 3-ureidoaniline, 2-methyl-5-acetylaminoaniline, 2-methoxy-5-acetylaminoaniline, 2-methoxy-5-methylaniline, 1-aminonaphthalene-6-sulfonic acid, 1-aminonaphthalene-7-sulfonic acid, 4-sulfo-1,3-diaminobenzene, 6-sulfo-2-methoxy-1-aminonaphthalene, 5,7-disulfo-2-aminonaphthalene, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 1-amino-8-naphthol-3,6-disulfonic acid, 1-amino-8-hydroxy-4,6-disulfonic acid, 1-amino-8-hydroxynaphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)- and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo) naphthalene-3,6-disulfonic acid, 1-amino-8hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-(β-aminoethyl)-3-cyano-4-methyl-6-hydroxypyrid-2-one, 1-((-aminopropyl)-3-sulfomethyl-4-methyl-6-hydroxypyrid-2-one, 1,3-diaminobenzene, 3-[N,N-di(β-hydroxyethyl)]aminoaniline, 3-[N,N-di)β-sulfatoethyl)]amino-4-methoxyaniline, 3-(sulfobenzylamino)aniline, 3-(sulfobenzylamino)$_4$-chloroaniline and 3-[N,N-di(sulfobenzyl)]aminoaniline, 2-sulfo-5-acetylaminoaniline, 2-amino-5-naphthol-7-sulfonic acid, 2-amino-8-naphthol-6-sulfonic acid, 1-(4'-aminobenzoyl)amino-8-hydroxynaphthalene-3,6-disulfonic acid, 1-(4'-aminobenzoyl)-amino-8-hydroxynaphthalene-4,6-disulfonic acid, 1-(3'-aminobenzoyl)-amino-8-hydroxynaphthalene-3,6-disulfonic acid, 1-(3'-aminobenzoyl)amino-8-hydroxynaphthalene-4,6-disulfonic acid, 1-(2'-aminobenzoyl)amino-8-hydroxynaphthalene-3,6-disulfonic acid, 1-(2'-aminobenzoyl)amino-8-hydroxynaphthalene-4,6-disulfonic acid, 2-(3'-aminobenzoyl)amino-5-hydroxynaphthalene-7-sulfonic acid, 2-(2'-aminobenzoyl)amino-5-hydroxynaphthalene-7-sulfonic acid, 2-(4'-aminobenzoyl)amino-8-hydroxynaphthalene-6-sulfonic acid, 2-(3'-aminobenzoyl) amino-8-hydroxynaphthalene-6-sulfonic acid, 2-(2'-aminobenzoyl)amino-8-hydroxynaphthalene-6-sulfonic acid, 2-(4'-aminobenzoyl)amino-5-naphthol-7-sulfonic acid, 1-(4'-amino- or 1-(4'-acetylamino-2-sulfophenyl)-3-methyl- or -3-carboxy-5-pyrazolone, N-(acetoacetyl)-3-sulfo-4-aminoanilide, 1-amino-8-naphthol-3,6- or -4,6-disulfonic acid, 1-(3'-aminobenzoyl)- or 1-(4'-aminobenzoyl)amino-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl—N-acetylamino)- or 2-methylamino-5-naphthol-7-sulfonic acid, N-methylaniline and N-propyl-m-toluidine.

Diazo components of the formula H$_2$N—D—NH$_2$ or H$_2$N-D$_1$—NH$_2$ may also be used in the form of the monoacylamino compounds, in which case the acyl radical is in particular acetyl. These monoacylamino compounds are initially diazotized and coupled with a coupleable compound; the acyl radical is then detached hydrolytically, and the thusly rereleased amino compound can be bonded to the fiber-reactive radical Z$^1$. Such monoacylated diamines are for example 2-sulfo-5-acetylaminoaniline and 2-sulfo-4-acetylaminoaniline. In similar fashion, amino-containing coupling components may be used in the coupling reaction in the form of the acylamino derivative, in which case the acyl radical may subsequently again be detached hydrolytically in order that the released amino group may be bonded to the fiber-reactive group $Z^1$. Bivalent coupling components useful for constructing disazo dyes according to the invention where the bivalent coupling radical is attached to two diazo components of which one contains a fiber-reactive radical R and the other a fiber-reactive radical Z, for example dyes of the general formulae (4c) and (4d), are for example resorcinol, 1,3-diaminobenzene, 5,5'-dihydroxy-7,7'-disulfo-2,2'-dinaphthylurea, 1,8-dihydroxy-3,6-disulfonaphthalene and especially 1-amino-8-naphthol-3,6-disulfonic acid and 1-amino-8-naphthol-4,6-disulfonic acid.

Phthalocyanine dyes according to the invention may be prepared by starting from an optionally sulfo-containing phthalocyanine sulfochloride and reacting it with amino compounds in any desired order, one of the amino compounds containing a fiber-reactive radical $R^G$ and the other either containing the fiber-reactive radical Z or else being a diamino compound in which that amino group which does not react with the phthalocyanine sulfochloride is intended to receive the fiber-reactive group $Z^1$. In addition to these two types of amino compounds, it is also possible to use such amino compounds as contain no fiber-reactive grouping, for example compounds which correspond to those of the general formula H—Q, where Q is as defined above, in which case W need not necessarily contain the water-solubilizing substituent. In the course of the reaction of the phthalocyanine sulfochloride with the amino compounds, which is preferably carried out in an aqueous medium and at a temperature between 20 and 45° C. and at a pH between 5.5 and 7.5, some of the sulfochloride groups may be converted into sulfo groups by hydrolysis. These reactions are known in the literature, for example from U.S. Pat. No. 4,745,187. Phthalocyanine dyes according to the invention may be synthesized according to the invention in a similar manner thereto.

For instance, phthalocyanine dyes of the general formula (11) according to the invention may be prepared by reacting a phthalocyanine sulfochloride of the general formula (63)

(63)

where Pc is as defined above, r is from 0 to 2, preferably zero, and s is from 1 to 4, subject to the proviso that the sum total of (r+s) is not more than 4, with an amino compound of the general formula (64) and an amino compound of the general formula (65)

 (64)

 (65)

where V, Y, z, $R^x$ and $Z^1$ are each as defined above, under the abovementioned conditions. But the phthalocyanine dyes of the general formula (11) may also be prepared by first reacting a compound of the general formula (63) with an amino compound of the general formula (64) and an amine of the general formula $H_2NR^x$ and then introducing the fiber-reactive group $Z^1$ into the free amino group, for example either by reaction with a compound of the general formula (60) or by reacting first with a cyanuric halide and then with cyanamide and the amine of the formula H—Q or by reaction of a dihalocyanamido-s-triazine with subsequent reaction of the H—Q amine.

The dyes of the formula (1) according to the invention are useful for dyeing and printing a wide variety of materials, such as silk, leather, wool, polyamide fibers and polyurethanes, and especially cellulosic fiber materials of any kind. Such fiber materials are for example the natural cellulose fibers, such as cotton, linen and hemp, and also woodpulp and regenerated cellulose. The dyes of the formula (1) are also useful for dyeing or printing hydroxyl-containing fibers present in blend fabrics, for example blends of cotton with polyester fibers or polyamide fibers. Dyes according to the invention may be applied to the fiber material and fixed on the fiber in various ways, especially in the form of aqueous dye solutions and print pastes. They are useful not only for the exhaust process but also for dyeing by the pad-dyeing process, whereby the material is impregnated with aqueous dye solutions, which may contain salt, and the dye is fixed following an alkali treatment or in the presence of alkali, with or without heating. Dyes according to the invention are particularly useful for the cold pad-batch process, whereby the dye is applied on a pad-mangle together with the alkali and then fixed by being stored at room temperature for several hours. After fixing, the dyeings or prints are thoroughly rinsed with cold and hot water in the presence or absence of an agent which has a dispersing effect and promotes the diffusion of the unfixed portions. These dyeing and printing processes are extensively described in the general technical literature and also in the patent literature.

The present invention therefore also provides for the use of the dyes of the general formula (1) according to the invention for dyeing (including printing) these materials, or to be more specific processes for dyeing (and printing) such materials in a conventional manner by using a dye of the general formula (1) as colorant by applying the dye of the general formula (1) to the material in an aqueous medium and fixing the dye on the material by means of heat or by means of an alkaline compound or both.

For anthraquinone dyes according to the invention which are insufficiently soluble in the alkaline dyeing liquor, this inconvenience may be remedied in the literature manner by addition of dispersants or other colorless compounds, for example a naphthalenesulfonic acid-formaldehyde condensate or especially anthraquinone-2-sulfonic acid.

The dyes of the formula (1) are notable for high reactivity, good fixation and very good build-up. They may therefore be used in low temperature exhaust dyeing processes and require only short steaming times in pad-steam processes. The degrees of fixation are high, and unfixed portions are easily washed off, the difference between the degree of exhaustion and the degree of fixation being remarkably small, i.e., the hydrolysis loss is very small.

The examples hereinbelow serve to illustrate the invention. Parts and percentages are by weight, unless otherwise stated. Parts by weight relate to parts by volume as the kilogram relates to the liter.

The compounds described in these examples by means of a formula are indicated in the form of their alkali metal salts. Generally they are synthesized and isolated in the form of their alkali metal salts, such as lithium, sodium or potassium salts, and used for dyeing in the form of their salts. It is similarly possible to use the starting compounds and components mentioned in the form of the free acid in the examples hereinbelow, especially table examples, in the synthesis as such or in the form of their salts, preferably alkali metal salts.

The visible absorption maxima ($\lambda_{max}$) reported for dyes according to the invention were determined on their alkali metal salts in aqueous solution. The table examples report the $\lambda_{max}$ values in parentheses in connection with the reported hue; the wavelength is reported in nm.

EXAMPLE A 18.6 g of trichlorotriazine were suspended in 200 ml of ice-water, 4.2 g of cyanamide were added, and the pH was maintained at pH 8–9 for 3 hours with aqueous sodium hydroxide solution. Thereafter, 25 g of N-methyl-2-(R-sulfatoethylsulfonyl)ethylamine were added, the mixture was heated to 50° C., and the pH was maintained at pH 6–6.5 by means of sodium carbonate.

The resulting aqueous solution of the following compound:

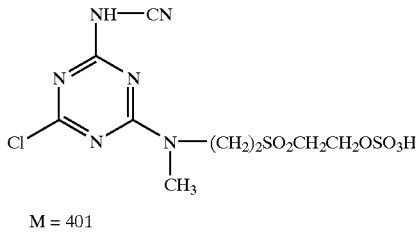

M = 401 can be used directly for further reactions, but may also be isolated by evaporating or salting out.

EXAMPLE B 18.6 g of trichlorotriazine are reacted with cyanamide as described in Example A and thereafter 30 g of N-phenyl-2-(β-sulfatoethylsulfonyl)ethylamine are added, a pH of 1–2 is set, and this value is maintained for 4 hours by addition of sodium carbonate solution. The pH is then adjusted to 6.5–7. The resulting aqueous solution of the following compound:

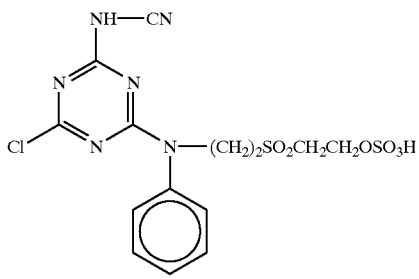

can be used directly for further reactions, but can also be isolated by evaporating or salting out.

The following compounds were reacted with chlorotriazine and cyanamide similarly to Example A:

| Example | Amine |
|---------|-------|
| C | 3-(β-sulfatoethylsulfonyl)propylamine |
| D | 2-(β-chloroethylsulfonyl)ethylamine |
| E | 2-(β-chloroethylsulfonyl)ethyloxyethylamine |

EXAMPLE 1

40 g of the intermediate of Example A were dissolved in 400 ml of water. 30 g of solid 1-amino-8-naphthol-3,6-disulfonic acid were added, the batch was heated to 60–70° C. and in the process a pH of 4 was maintained. After the reaction had ended, the batch was cooled down to 0–5° C. in the course of about 5 hours.

28 g of 4-(β-sulfatoethylsulfonyl)aniline were diazotized in a conventional manner and coupled on at pH 4–5 maintained with sodium carbonate solution.

The resulting dye of the following constitution:

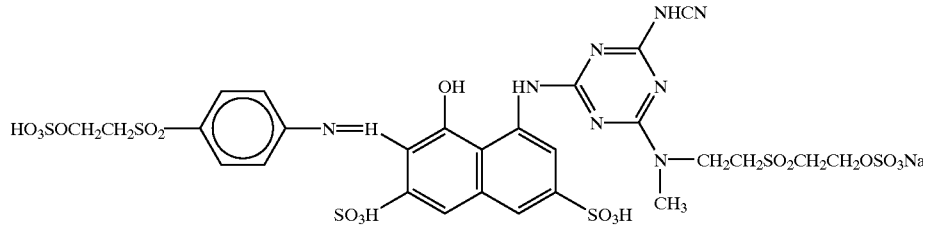

dyes and prints cotton in bluish red shades and good general fastnesses.

$\lambda_{max}=520$ nm.

EXAMPLE 2

40 g of the intermediate of Example A were dissolved in 400 ml of water, 22 g of 2-amino-5-naphthol-7-sulfonic acid were added, the batch was heated at 60° C. and a pH of 5.5–6 was maintained with sodium carbonate solution for 5 hours.

Thereafter, the batch was cooled down to 0–5° C. with ice and 28 g of conventionally diazotized 2-naphthylamine-1,5-disulfonic acid were coupled on at pH 6–7.

The resulting dye of the following constitution:

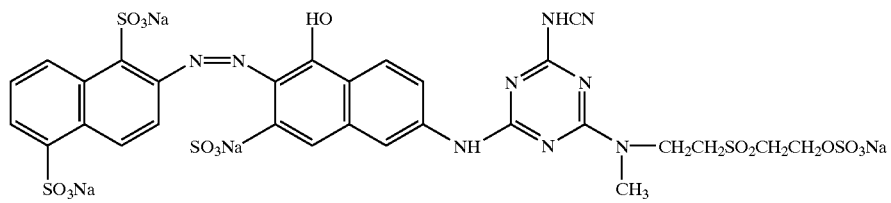

was isolated by salting out. It dyes and prints cotton in fast orange shades.

λ$_{max}$=488 nm.

EXAMPLE 3

60 g of the chromophore of the following constitution:

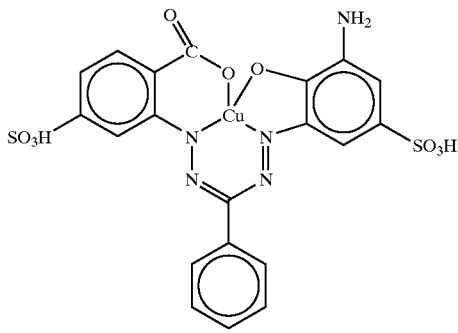

were dissolved in 200 ml of water at room temperature and adjusted to pH$_{4.5}$.

37 g of the intermediate of Example B were then added, the batch was heated to 55–60° C. and a pH of 4.5–5 was maintained with sodium bicarbonate. After 4 hours, the batch was cooled down, adjusted to pH 6.2, and the dye of the following constitution:

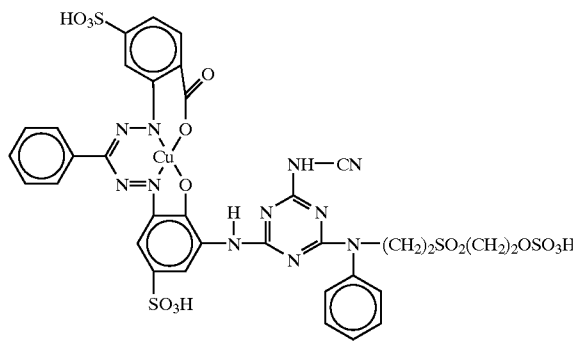

was isolated by salting out. It dyes and prints cotton in deep blue shades having good general fastnesses.

λ$_{max}$=611 nm.

EXAMPLE 4

To the intermediate solution obtained in Example B were added 17 g of 1,3-diaminobenzene-4-sulfonic acid, the batch was heated to 50–60° C., and a pH of 4–5 was maintained with sodium carbonate fly) solution. After the reaction had ended, the batch was cooled down to 0–5° C., a pH of 6.5 was set, 20 ml of 5 N sodium nitrite solution were added, and the resulting solution was added dropwise to a mixture of 50 ml of concentrated carboxylic acid, 50 ml of water and 70 g of ice. The temperature was maintained by addition of ice. The batch was subsequently stirred for 1 hour, the excess of nitrous acid was removed by addition of amidosulfuric acid, and a suspension of N-ethyl-2-hydroxy4-methylpyrid-6-one-5-carboxamide in 60 ml of water was added, and a pH of 6.5–7 was maintained with sodium carbonate solution. After the coupling had ended, the dye of the following constitution:

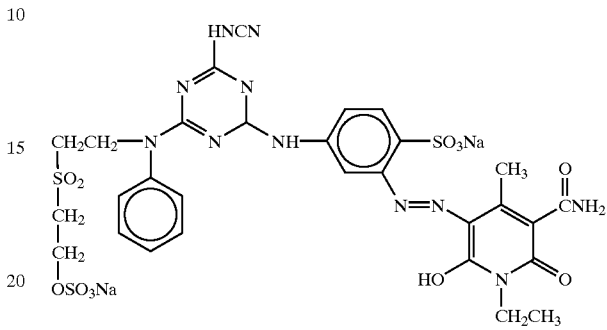

was isolated by salting out.

EXAMPLE 5

The intermediate solution obtained in Example A was admixed with 16 g of 1,3-diaminobenzene-4-sulfonic acid, heated to 60° C. and maintained at a pH of 4.5–5 with sodium carbonate solution. After 5 hours, the batch was cooled down to 0–5° C. and 25 g of conventionally diazotized 4-(1-sulfatoethylsulfonyl)aniline were added and coupled on at pH 5.5–6. The resulting dye of the following constitution:

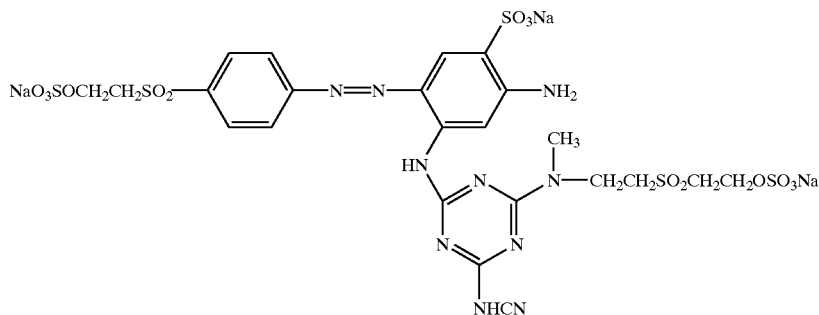

was isolated by salting out.

EXAMPLE 6

40 g of the intermediate of Example C were dissolved in 400 ml of water, 17 g of 1,3-diaminobenzene-4-sulfonic acid were added, the solution was heated to 60° C. and a pH of 4.5–5 was maintained with sodium carbonate solution, thereafter the batch was adjusted to pH 6.5 and diazotized as in Example 4. A suspension of 53 g of the following dye:

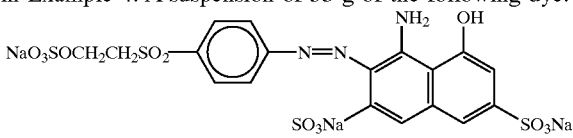

was then added, the pH adjusted to 6.5–7 and maintained for 5 hours. Thereafter, the dye of the following constitution:

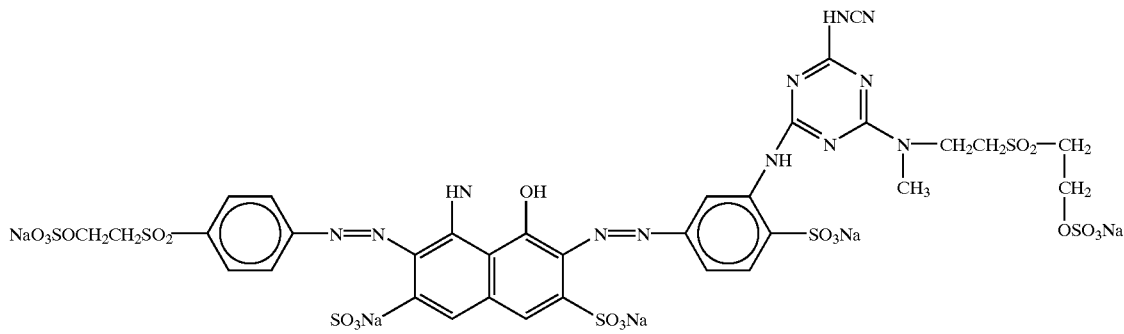

EXAMPLE 7

96 g of copper phthalocyanine tetrasulfochloride were suspended in 500 ml of water and reacted with 27 g of 1,3diaminobenzene-4-sulfonic acid and 0.5 g of pyridine at 20° C. and pH 7–7.5. After 8 hours, 60 g of the intermediate of Example A were added, the batch was heated to 70–80° C., and a pH of 4.5–5 was maintained with sodium carbonate solution.

After 7 hours, the batch was cooled down, the pH adjusted to 6.5, and the dye of the following constitution:

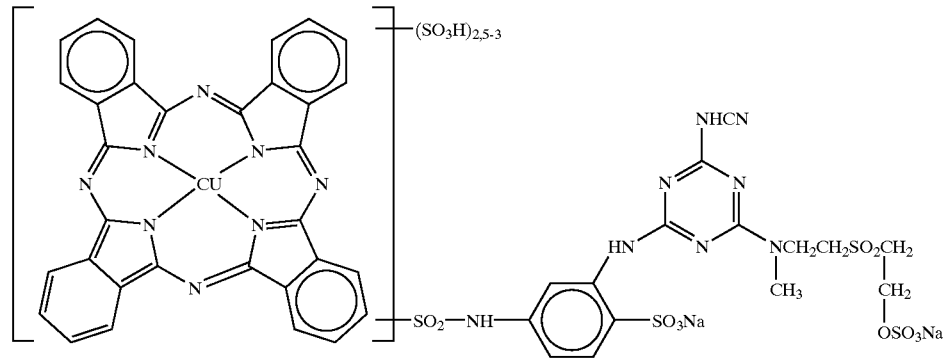

was isolated by salting out.

It dyes and prints cotton in fast greenish blue shades. The following products were reacted with each other similarly to Examples 1–3:

| Ex. | Diazo component | Coupler | Fiber-reactive moiety | Hue |
|---|---|---|---|---|
| 8 | aniline-2-sulfonic acid | 1-amino-8-naphthol-3,6-disulfonic acid | Ex. B | red |
| 9 | 2-naphthylamine-1,5-disulfonic acid | 1-amino-8-naphthol-3,6-disulfonic acid | Ex. E | bluish red |
| 10 | 4-(β-sulfatoethylsulfonyl)aniline | 1-amino-8-naphthol-4,6-disulfonic acid | Ex. C | red |
| 11 | 2-naphthylamine-1,5-disulfonic acid | 2-amino-5-naphthol-7-sulfonic acid | Ex. D | orange |
| 12 | 4-methylaniline-2-sulfonic acid | 2-amino-5-naphthol-7-sulfonic acid | Ex. B | orange |
| 13 | 4-methoxyaniline-2-sulfonic acid | 2-amino-5-naphthol-7-sulfonic acid | Ex. A | scarlet |
| 14 | 4-methoxyaniline-2-sulfonic acid | 2-amino-5-naphthol-1,7-disulfonic acid | Ex. B | scarlet |
| 15 | 2-naphthylamine-1-sulfonic acid | 2-amino-5-naphthol-1,7-disulfonic acid | Ex. B | scarlet |

-continued

| Ex. | Diazo component | Coupler | Fiber-reactive moiety | Hue |
|---|---|---|---|---|
| 16 | NH₂, SO₃H, N=N, SO₃H (aminobenzenesulfonic acid–azo–benzenesulfonic acid) | 2-amino-5-naphthol-1,7-disulfonic acid | Ex. A | scarlet |
| 17 | NH₂, SO₃H, N=N, SO₃H | 2-amino-5-naphthol-1,7-disulfonic acid | Ex. B | scarlet |

Following components were reacted with each other similarly to Ex. 4:

| Ex. | Diazo component | Coupler | Fiber-reactive moiety | Hue |
|---|---|---|---|---|
| 18 | N-ethyl-1-hydroxy-3-methyl-5-sulfomethylpyrid-6-one | 1,3-diamino-benezene-4-sulfonic acid | Ex. A | yellow |
| 19 | N-ethyl-1-hydroxy-3-methyl-5-sulfomethylpyrid-6-one | 1,3-diamino-benezene-4-sulfonic acid | Ex. B | yellow |
| 20 | N-ethyl-2-hydroxy-4-methyl-pyrid-5-one-4-carboxamide | 1,3-diamino-benzene-4-sulfonic acid | Ex. E | yellow |
| 21 | N-ethyl-2-hydroxy-4-methyl-pyrid-5-one-4-carboxamide | 1,3-diamino-benzene-4-sulfonic acid | Ex. E | yellow |
| 22 | 1-(4-sulfophenyl)-pyrazol-5-one-3-carboxylic acid | 1,3-diamino-benzene-4-sulfonic acid | Ex. C | yellow |
| 23 | 1-(4-sulfophenyl)-pyrazol-5-one-3-carboxylic acid | 1,3-diamino-benzene-4-sulfonic acid | Ex. D | yellow |
| 24 | 1-(4-β-sulfatoethyl-sulfonyl)phenyl)-3-methylpyrazol-5-one | 1,3-diamino-benzene-4-sulfonic acid | Ex. A | yellow |
| 25 | 2-acetylamine-5-hydroxy-naphthalene-7-sulfonic acid | 1,3-diamino-benzene-4-sulfonic acid | Ex. A | yellowish orange |
| 26 | 4-(β-sulfatoethyl-sulfonyl)aniline | 1,3-diamino-benzene-sulfonic acid | Ex. B | golden yellow |
| 27 | 4-(βsulfatoethyl-sulfonyl)aniline | 1,3-diamino-benzene-sulfonic acid | Ex. C | golden yellow |
| 28 | 4-(βsulfatoethyl-sulfonyl)aniline | 1,3-diamino-benzene-sulfonic acid | Ex. D | golden yellow |
| 29 | 4-(βsulfatoethyl-sulfonyl)aniline | 1,3-diamino-benzene-sulfonic acid | Ex. E | golden yellow |

What is claimed is:
1. A dye conforming to the general formula (1)

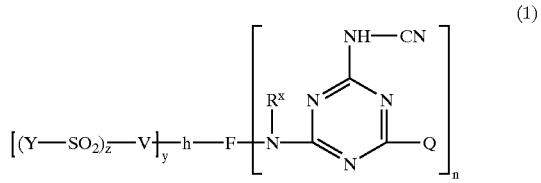

(1)

wherein
  F is the residue of a polyazo dye, a derived heavy metal complex azo dye, an anthraquinone, azomethine, phenazine, stilbene, triphenylmethane, xanthene, thioxanthene, nitroaryl, naphthoquinone, pyrenequinone, perylenetetracarbimide dye or is of the formula (X)

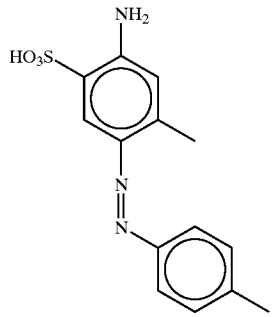

(X)

R$^x$ is a hydrogen atom or an alkyl group of 1 to 4 carbon atoms, which may be substituted by halogen, hydroxyl, cyano, alkoxy of 1 to 4 carbon atoms, alkoxycarbonyl of 2 to 5 carbon atoms, carboxyl, sulfamoyl, sulfo or sulfato, n is 1 or 2;

Q is a group of the general formula (2)

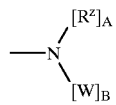

(2)

wherein

R$^z$ is a hydrogen atom or an alkyl group of 1 to 4 carbon atoms, which may be substituted by halogen, hydroxyl, cyano, alkoxy of 1 to 4 carbon atoms, carboxyl, sulfamoyl, sulfo, sulfato, phenyl or phenyl substituted by substituents selected from the group consisting of halogen, alkoxy of 1 to 4 carbon atoms, alkyl of 1 to 4 carbon atoms, sulfo and carboxyl, or is a cyclohexyl radical, a phenyl radical or a phenyl radical substituted by substituents selected from the group consisting of halogen, alkoxy of 1 to 4 carbon atoms, alkyl of 1 to 4 carbon atoms, sulfo and carboxyl, W is alkyl-SO$_2$—Y, alkyl-Het-alkyl-SO$_2$—Y, where alkyl represents alkyl radicals of 1 to 4 carbon atoms, Het is —O—, —NH—, —N(alkyl)- where alkyl represents alkyl radicals of 1 to 4 carbon atoms, —S—, or SO$_2$ and Y is as defined below;

A is zero or 1, and

B is 1 or 2, the sum of (A +B) is 2 and in the event of B being 2 the groups of the formula —W—(SO$_2$—Y)$_z$ being identical to or different from each other;

V is a direct bond or an alkylene group or is a substituted or unsubstituted arylene radical or an alkylene-arylene or arylene-alkylene or alkylene-arylene-alkylene or arylene-alkylene-arylene radical or an arylene-arylene radical interrupted by one of the hetero groups indicated hereinafter, wherein the alkylene radicals are alkylene radicals of 1 to 8 carbon atoms and may be substituted, and the arylene radicals are substituted or unsubstituted phenylene or naphthylene radicals, and where the alkylene radicals may be interrupted by 1 or more hetero groups, and the alkylene and arylene moieties in the combined alkylene/arylene radicals may in each case be separated from each other by a hetero group; and said hetero group(s) contains at least one N, S or O atom, Y is 0, 1 or 2;

z is 1 or2;

h is for y=2 a nitrogen atom or for y=1 a group of the formula —NH—, —N(R)—, —NH—CO—NH—, —CO—NH— or a direct bond and wherein R is alkyl of 1 to 4 carbon atoms which is optionally substituted with sulfo, carboxyl, sulfato, phenyl or sulfophenyl, Y is vinyl or is an ethyl group β-substituted by an alkali-eliminable substituent, and the —SO$_2$—Y group or groups may be attached to an aromatic carbon atom of F or V directly or via an alkylene radical of 1 to 4 carbon atoms or via an alkylamino group of 1 to 4 carbon atoms.

2. The dye as claimed in claim 1, wherein R$^x$ and R$^z$ are each hydrogen.

3. The dye as claimed in claim 1, wherein R$^z$ is methyl.

4. The dye as claimed in claim 1, wherein W is —(CH$_2$)$_2$SO$_2$Y.

5. The dye as claimed in claim 1, wherein y is 1 and V is a direct bond.

6. A process for dyeing and printing cotton which comprises contacting said cotton with the dye as claimed in claim 1.

7. A process for preparing the dye as claimed claim 1, which comprises the steps of reacting (a) a trihalo-s-triazine of the formula (56)

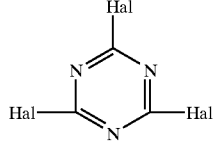

(56)

wherein Hal is a halogen atom, with a cyanamide or an alkali metal salt thereof and (b) reacting the product formed in step (a) with an amine of the general formula H—Q, (c) reacting with a compound of the formula (55)

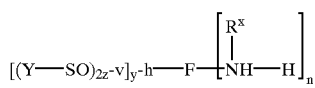

(55)

either in said step (a) or after said step (b), and (d) subsequently preparing the final dye.

8. The dye as claimed in claim 1, wherein n is 1 and V is a direct bond or an alkylene group or is a substituted or unsubstituted arylene radical or an alkylene-arylene or arylene-alkylene or alkylene-arylene-alkylene or arylene-alkylene-arylene radical or an arylene-arylene radical interrupted by one of the hetero groups indicated hereinafter, where the alkylene radicals are alkylene radicals of 1 to 8 carbon atoms and may be substituted, and the arylene radicals are substituted or unsubstituted phenylene or naphthylene radicals, and where the alkylene radicals may be interrupted by 1 or more hetero groups selected from the group consisting of —NH—, —O—, —S—, —SO$_2$—, —CO—, —SO$_2$—NH—, —NH—SO$_2$, —NH—CO—, —CO—NH—, and —NR— where R is allyl of 1 to 4 carbon atom which is optionally substituted by sulfo, carboxyl, sulfato, phenyl or sulfophenyl and the alkylene and arylene moieties in the combined alkylene/arylene radicals may in each case be separated from each other by said hetero groups.

9. The dye as claimed in claim 2 wherein W is —(CH$_2$)$_2$SO$_2$Y and y is 1 and V is a direct bond.

10. The dye as claimed in claim 1, where R$^x$ is hydrogen and R$^z$ is methyl, W is —(CH$_2$)$_2$SO$_2$Y, y is 1 and V is a direct bond.

11. The dye as claimed in claim 1, wherein V is an alkylene radical having 2 to 4 carbon atoms which is optionally substituted by sulfo, carboxyl, sulfato and/or phosphato.

12. The dye as claimed in claim 1, wherein z is 1.

13. A dye conforming to the general formula (1)

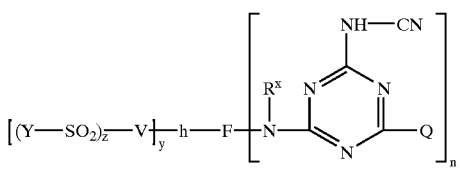

wherein
F is the residue of a monoazo, disazo or polyazo dye or of a derived heavy metal complex azo dye or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye;
R$^x$ is a hydrogen atom,
n is 1 or 2;
Q is a group of the general formula (2)

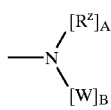

wherein
R$^z$ is methyl,
W is —(CH$_2$)$_2$SO$_2$Y and Y is as defined below;
A is zero or 1, and
B is 1 or 2,
the sum of (A+B) is 2 and in the event of B being 2 the groups of the formula —W—(SO$_2$—Y)$_z$ being identical to or different from each other;
V is a direct bond or an alkylene group having 2 to 4 carbon atoms which is optionally substituted by sulfo, carboxyl, sulfato and/or phosphato;
y is 1;
z is 1 or 2;
h is of the formula —NH—, —NR—, —NH—CO—NH—, —CO—NH— or a direct bond wherein R is alkyl of 1 to 4 carbon atoms which may be sulfo-, carboxyl-, sulfato-, phenyl- or sulfophenyl-substituted, —O—, —S—, —SO$_2$—, —CO—, —SO$_2$—NH—, —NH—SO$_2$—, —NH—CO— or —CO—NH—
Y is vinyl or is an ethyl group P-substituted by an alkali-eliminable substituent, and the —SO$_2$—Y group or groups may be attached to an aromatic carbon atom of F or V directly or via an alkylene radical of 1 to 4 carbon atoms or via an alkylamino group of 1 to 4 carbon atoms.

14. A process for dyeing and printing cotton which comprises contacting said cotton with the dye as claimed in claim 13.

15. A process for preparing the dye as claimed claim 13, which comprises the steps of reacting
   a. a trihalo-s-triazine of the formula (56)

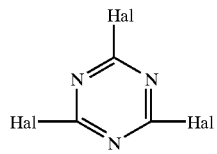

wherein Hal is a halogen atom, with a cyanamide or an alkali metal salt thereof and
   b. reacting the product formed in step a. with an amine of the general formula H—Q,
   c. reacting with a compound of the formula (55)

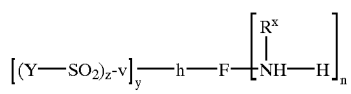

either in said step a or after said step b, and
   d. subsequently preparing the final dye.

16. The dye as claimed in claim 13, wherein n is 1 and V is a direct bond.

17. The dye as claimed in claim 13, wherein z is 1 and V is a direct bond.

18. The dye as claimed in claim 17, wherein F is a radical of the formula (X)

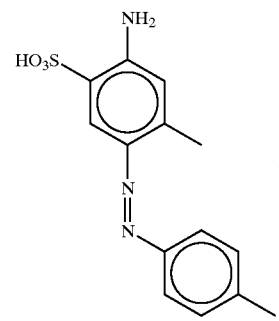

19. A process for preparing the dye of the general formula (I),

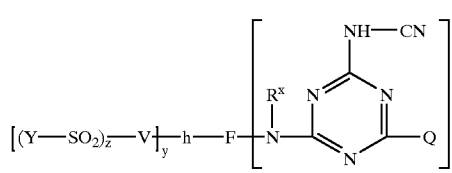

wherein
F is the residue of a monoazo, disazo or polyazo dye or of a derived heavy metal complex azo dye or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dye; and the —SO$_2$—Y group or groups may be attached to an aromatic carbon atom of F or V directly or via an alkylene radical of 1 to 4 carbon atoms or via an alkylamino group of 1 to 4 carbon atoms, which comprises the steps of reacting (a) a trihalo-s-triazine of the formula (56)

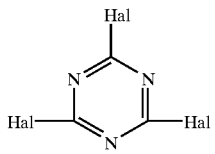

(56)

wherein Hal is a halogen atom, with a cyanamide or an alkali metal salt thereof and (b) reacting the product formed in step (a) with an amine of the general formula H—Q, (c) reacting with a compound of the formula (55)

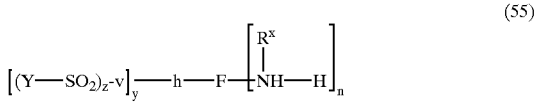

(55)

either in said step (a) or after said step (b), and (d) subsequently preparing the final dye.

20. The dye as claimed in claim 1, wherein F is a radical of the formula (X)

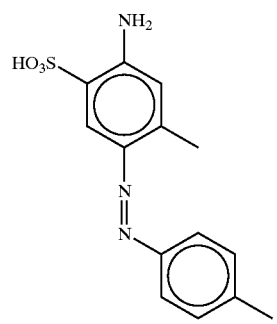

(X)

* * * * *

UNITED STATES PATENT AND TRADEMARK OFFICE
CERTIFICATE OF CORRECTION

PATENT NO.    : 6,444,794 B1
DATED         : September 3, 2002
INVENTOR(S)   : Dannheim et al.

It is certified that error appears in the above-identified patent and that said Letters Patent is hereby corrected as shown below:

Column 36,
Line 5, delete "or2" and insert -- or 2 --.

Column 36,
Formula 55, please delete the formula:

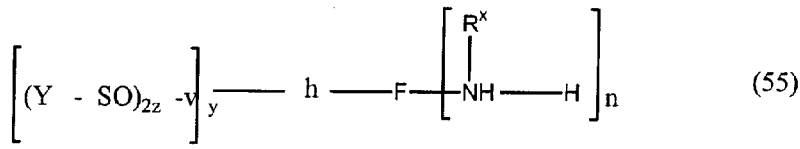

and insert the formula:

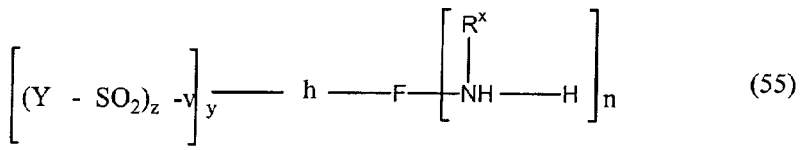

Line 67, please delete "allyl" and insert -- alkyl --.

Column 37,
Line 1, please delete "atom" and insert -- atoms --.
Line 65, please delete "P-substituted" and insert -- ß-substituted --.

Column 39,
Line 4, after the phrase "perylenetetracarbimide dye;" please insert --

$R^x$     is a hydrogen atom or an alkyl group of 1 to 4 carbon atoms, which may be substituted by halogen, hydroxyl, cyano, alkoxy 1 to 4 carbon atoms, alkoxycarbonyl of 2 to 5 carbon atoms, carboxyl, sulfamoyl, sulfo or sulfato, n     is 1 or 2;
    Q     is a group of the general formula (2)

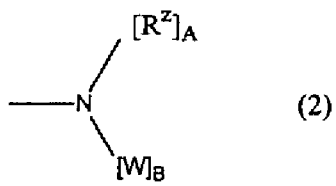

UNITED STATES PATENT AND TRADEMARK OFFICE
CERTIFICATE OF CORRECTION

PATENT NO. : 6,444,794 B1
DATED : September 3, 2002
INVENTOR(S) : Dannheim et al.

It is certified that error appears in the above-identified patent and that said Letters Patent is hereby corrected as shown below:

wherein
- $R^Z$ is a hydrogen atom or an alkyl group of 1 to 4 carbon atoms, which may be substituted by halogen, hydroxyl, cyano, alkoxy of 1 to 4 carbon atoms, carboxyl, sulfamoyl, sulfo, sulfato, phenyl or phenyl substituted by substituents selected from the group consisting of halogen, alkoxy of 1 to 4 carbon atoms, alkyl of 1 to 4 carbon atoms, sulfo and carboxyl, or is a cyclohexyl radical, a phenyl radical or a phenyl radical substituted by substituents selected from the group consisting of halogen, alkoxy of 1 to 4 carbon atoms, alkyl of 1 to 4 carbon atoms, sulfo and carboxyl,
- W is alkyl-$SO_2$-Y, alkyl-Het-alkyl-$SO_2$-Y, where alkyl represents alkyl radicals of 1 to 4 carbon atoms,
  Het is –O-, -NH-, -N(alkyl)- where alkyl represents alkyl radicals of 1 to 4 carbon atoms, -S- or $SO_2$ and Y is as defined below;
- A is zero or 1, and
- B is 1 or 2,
  sum of (A + B) is 2 and in the event of B being 2 the groups of the formula –W-$(SO_2$-Y$)_z$ being identical to or different from each other;
- V is a direct bond or an alkylene group or is a substituted or unsubstituted arylene radical or an alkylene-arylene or arylene-alkylene or alkylene-arylene-alkylene or arylene-alkylene-arylene radical or an arylene-arylene radical interrupted by one of the hetero groups indicated hereinafter, where the alkylene radicals are alkylene radicals of 1 to 8 carbon atoms and may be substituted, and the arylene radicals are substituted or unsubstituted phenylene or naphthylene radicals, and where the alkylene radicals may be interrupted by 1 or more hetero groups,
  and the alkylene and arylene moieties in the combined alkylene/arylene radicals may in each case be separated from each other by a hetero group; and said hetero group contains at least one N, S or O atom,
- y is 0, 1 or 2;
- z is 1 or 2;

UNITED STATES PATENT AND TRADEMARK OFFICE
CERTIFICATE OF CORRECTION

PATENT NO. : 6,444,794 B1
DATED : September 3, 2002
INVENTOR(S) : Dannheim et al.

It is certified that error appears in the above-identified patent and that said Letters Patent is hereby corrected as shown below:

h    is for y = 2 a nitrogen atom or for y = 1 a group of the formula $-NH-$, $-NR-$, $-NH-CO-NH-$, or a direct bond, $-O-$, $-S-$, $-SO_2-$, $-CO-$, $-SO_2-NH-$, $-NH-SO_2-$, $-NH-CO-$ or $-CO-NH-$ and wherein R is alkyl of 1 to 4 carbon atoms which is optionally substituted with sulfo, carboxyl, sulfato, phenyl or sulfophenyl, Y    is vinyl or is an ethyl group β-substituted by an alkali-eliminable substituent, --.

Signed and Sealed this

Twenty-eighth Day of January, 2003

JAMES E. ROGAN
*Director of the United States Patent and Trademark Office*